(12) United States Patent
Shigemitsu et al.

(10) Patent No.: US 8,598,278 B2
(45) Date of Patent: Dec. 3, 2013

(54) GOLF BALL

(71) Applicant: Dunlop Sports Co. Ltd., Kobe (JP)

(72) Inventors: Takahiro Shigemitsu, Kobe (JP); Sakoto Okabe, Kobe (JP)

(73) Assignee: SRI Sports Limited, Kobe-shi (JP)

( * ) Notice: Subject to any disclaimer, the term of this patent is extended or adjusted under 35 U.S.C. 154(b) by 0 days.

(21) Appl. No.: 13/686,083

(22) Filed: Nov. 27, 2012

(65) Prior Publication Data

US 2013/0085014 A1 Apr. 4, 2013

Related U.S. Application Data

(62) Division of application No. 12/554,155, filed on Sep. 4, 2009, now Pat. No. 8,349,958.

(30) Foreign Application Priority Data

Sep. 22, 2008 (JP) ................... 2008-243171
Dec. 18, 2008 (JP) ................... 2008-322951

(51) Int. Cl.
*A63B 37/00* (2006.01)
*C08L 33/02* (2006.01)

(52) U.S. Cl.
USPC ........... 525/196; 525/201; 525/221; 473/373; 473/374

(58) Field of Classification Search
None
See application file for complete search history.

(56) References Cited

U.S. PATENT DOCUMENTS

| | | | |
|---|---|---|---|
| 3,819,768 A | 6/1974 | Molitor | |
| 4,526,375 A | 7/1985 | Nakade | |
| 5,292,794 A | 3/1994 | Maginnis | |
| 5,298,571 A | 3/1994 | Statz et al. | |
| 6,089,847 A | 7/2000 | Inoue et al. | |
| 6,190,597 B1 | 2/2001 | Inoue et al. | |
| 6,235,230 B1 | 5/2001 | Puniello | |
| 6,238,194 B1 | 5/2001 | Inoue et al. | |
| 6,838,501 B2 | 1/2005 | Takesue et al. | |
| 6,962,951 B1 | 11/2005 | Takesue et al. | |
| 7,211,610 B2 | 5/2007 | Takesue et al. | |
| 8,349,958 B2 * | 1/2013 | Shigemitsu et al. | 525/196 |
| 2002/0037968 A1 | 3/2002 | Chen | |
| 2002/0099120 A1 | 7/2002 | Takesue et al. | |
| 2004/0132552 A1 | 7/2004 | Chen | |
| 2005/0256269 A1 | 11/2005 | Takesue et al. | |
| 2005/0261424 A1 | 11/2005 | Snell et al. | |
| 2006/0014898 A1 | 1/2006 | Kim | |
| 2006/0270491 A1 | 11/2006 | Jordan et al. | |
| 2006/0293121 A1 | 12/2006 | Egashira et al. | |
| 2008/0220904 A1 | 9/2008 | Sullivan et al. | |
| 2008/0227569 A1 | 9/2008 | Egashira et al. | |
| 2010/0069173 A1 | 3/2010 | Okabe et al. | |
| 2010/0069177 A1 | 3/2010 | Okabe | |
| 2010/0075777 A1 | 3/2010 | Shigemitsu et al. | |
| 2010/0167846 A1 | 7/2010 | Hirau et al. | |
| 2010/0298066 A1 | 11/2010 | Kim | |

FOREIGN PATENT DOCUMENTS

| | | |
|---|---|---|
| JP | 2-88087 A | 3/1990 |
| JP | 9-313646 A | 12/1997 |
| JP | 11-76466 A | 3/1999 |
| JP | 11-151323 A | 6/1999 |
| JP | 11-164914 A | 6/1999 |
| JP | 2001-120686 A | 5/2001 |
| JP | 2000-219195 A | 8/2002 |
| JP | 2005-230212 A | 9/2005 |
| JP | 2006-500995 A | 1/2006 |
| JP | 2006-28517 A | 2/2006 |
| JP | 3751824 B2 | 3/2006 |
| JP | 2007-622 A | 1/2007 |

OTHER PUBLICATIONS

Honeywell product literature for ACLYN 201A; no date.*
Honeywell product literature for ACLYN 295P; no date.*
English translation of the Japanese Office Action issued Apr. 19, 2011, in Japanese Patent Application No. 2008-335603.
English translation of the Japanese Office Action issued Mar. 22, 2011, in Japanese Patent Application No. 2008-269361.
Honeywell product literature ACLYN 201A; no date.
Honeywell product literature ACLYN 259P; no date.
Office Action issued Apr. 9, 2012, in U.S. Appl. No. 12/560,190.
Office Action issued Aug. 22, 2012, in U.S. Appl. No. 12/560,190.
Office Action issued May 31, 2012, in U.S. Appl. No. 12/557,785.
Office Action issued Sep. 14, 2012, in U.S. Appl. No. 12/627,460.
Office Action issued Oct. 24, 2012, in U.S. Appl. No. 12/557,785.

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a resin composition for the golf ball that suppresses the bleed out of the low molecular weight material component, as well as improves the fluidity and repulsion performance. The present invention provides a golf ball forming resin composition comprising as a resin component, (A) a high melt viscosity resin; (B) a low melt viscosity ionomer resin having a melt viscosity (190° C.) ranging from 1 Pa·s to 10 Pa·s measured by a brookfield viscometer, in a ratio of (A) the high melt viscosity resin/(B) the low melt viscosity ionomer resin being 55 mass % to 99 mass %/45 mass % to 1 mass %; and (C) a metal ion source capable of neutralizing carboxyl groups of (A) the high melt viscosity resin and (B) the low melt viscosity ionomer resin, in an amount of from 0.1 part to 10 parts with respect to 100 parts by mass of a sum of (A) the high melt viscosity resin and (B) the low melt viscosity ionomer resin.

8 Claims, No Drawings

US 8,598,278 B2

GOLF BALL

CROSS-REFERENCE TO RELATED APPLICATIONS

The present application is a 37 C.F.R. §1.53(b) divisional of U.S. application Ser. No. 12/554,155 filed Sep. 4, 2009 now U.S. Pat. No. 8,349,958, which claims priority on Japanese Patent Application Nos. 2008-243171 and 2008-322951 filed Sep. 22, 2008, and Dec. 18, 2008, respectively. The contents of each of the above applications is hereby incorporated by reference.

FIELD OF THE INVENTION

The present invention relates to a resin composition for a golf ball and a golf ball using the same.

DESCRIPTION OF THE RELATED ART

Ionomer resins are used as a cover material for the golf ball, because of its excellent durability and repulsion performance. However, the heat stability and moldability are also necessary to prepare golf balls using ionomer resins. Further, the obtained golf balls are required to show the excellent shot feeling, controllability, repulsion performance and durability.

From these aspects, various improvements have been proposed for golf balls using ionomer resins as a cover material. Japanese Patent Publication No. 2002-219195 A discloses a golf ball material that provides a high performance golf ball having an excellent repulsion as well as a good thermal stability, fluidity, and moldability. The golf ball material comprises a mixture which is composed of essential components:

100 pars by weight of a resinous component consisting of a base resin and (e) a non-ionomer thermoplastic elastomer, the base resin and the elastomer being blended in a weight ratio of 100:0 to 50:50;

(c) 5 to 80 parts by weight of a fatty acid and/or fatty acid derivative having a molecular weight of 280 to 1,500; and (d) 0.1 to 10 parts by weight of a basic inorganic metal compound capable of neutralizing acidic groups left unneutralized in the base resin and component (c), wherein the base resin has (a) an olefin-unsaturated carboxylic acid binary random copolymer and/or a metal ion-neutralized olefin-unsaturated carboxylic acid binary random copolymer, blended with (b) an olefin-unsaturated carboxylic acid-unsaturated carboxylate ternary random copolymer and/or a metal ion neutralized olefin-unsaturated carboxylic acid-unsaturated carboxylate ternary random copolymer, in a weight ratio of 100:0 to 25:75.

Japanese Patent Publication No. 2001-120686 A discloses a golf ball material containing a highly neutralized ionomer resin that provides a high performance golf ball having an excellent repulsion as well as good thermal stability, fluidity, and moldability. The golf ball material comprises a heated mixture having a melt index of 1.0 dg/min or more which is composed of:

100 parts by weight of (a) an olefin-unsaturated carboxylic acid random copolymer and/or an olefin-unsaturated carboxylic acid-unsaturated carboxylate random copolymer, (b) 5 to 80 parts by weight of a fatty acid or a derivative thereof having a molecular weight of 280 or more, and (c) 0.1 to 10 parts by weight of a basic inorganic metal compound capable of neutralizing acidic groups in components (a) and (b).

Japanese Patent Publication No. 2006-28517 A discloses a blend composition containing a reaction product of three components (A), (B) and (C). The component (A) is a polymer containing ethylene and/or an α-olefin, and one or more α, β-ethylenically unsaturated C3-C20 carboxylic acids, sulfonic acids or phosphoric acids. Component (B) is a compound having the general formula: $(R_2N)_m—R'—(X(O)_nOR_y)_m$. Component (C) is a basic metal ion salt which has a capacity to neutralize some, or all of the acidic group present in the components (A) and (B).

Japanese Patent Publication No. 2006-500995 T discloses a golf ball which has an improved softness and scuff resistance while maintaining the durability and flight distance. The golf ball employs a blend of ionomer resins that have a different molecular weight each other, that is, a blend of a high molecular weight ternary ionomer resin (molecular weight about 80,000 to 500,000) and a low molecular weight binary ionomer resin (molecular weight about 2,000 to 30,000).

SUMMARY OF THE INVENTION

In order to enhance the repulsion of the golf ball, there is an approach of making the thin-walled cover or intermediate layer. However, the ionomer resin used as a material must have a high fluidity in order to make the thin-walled cover or intermediate layer. As a technology of improving the fluidity of the ionomer resin while maintaining the repulsion performance, it is known that a low molecular weight material such as a fatty acid is added to the ionomer resin having a high degree of neutralization. However, the addition of the low molecular weight material such as a fatty acid causes smoke generation during the molding. Further, if the intermediate layer is formed from the ionomer resin to which the low molecular weight material is added, the low molecular weight material component tends to bleed out of a surface of the intermediate layer. As a result, there are the problems that the adhesion between the intermediate layer and the center, and the adhesion between the intermediate layer and the cover formed on the intermediate layer are lowered. Moreover, if the cover is formed from the ionomer resin to which the low molecular weight material is added, the low molecular weight material component tends to bleed out of a surface of the golf ball body. As a result, the adhesion of the paint film is lowered when applying a paint to the surface of the golf ball.

The present invention has been achieved in view of the above circumstances. An object of the present invention is to provide a resin composition for the golf ball that suppresses the bleed out of the low molecular weight material component, as well as improves the fluidity and repulsion performance.

Another object of the present invention is to provide a golf ball excellent in the adhesion between the layers and the repulsion of the intermediate layer by improving the fluidity and the repulsion of the intermediate layer composition without lowering the adhesion of the intermediate layer to the center or the cover.

Yet another object of the present invention is to provide a golf ball excellent in the fluidity, the adhesion of the paint film, and the repulsion.

The present invention provides a golf ball forming resin composition comprising as a resin component, (A) a high melt viscosity resin containing (a-1) a high melt viscosity ionomer resin having a melt viscosity (190° C.) ranging from 500 Pa·s to 100,000 Pa·s measured by a flow tester and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, and/or (a-2) a high melt viscosity nonionic resin having a melt viscosity (190° C.) ranging from 5 Pa·s to 3,000 Pa·s measured by a flow tester and consisting of a binary copolymer composed of ethylene and α,β-unsaturated carboxylic acid having 3 to 8 carbon atoms, a ternary copolymer composed of ethylene, α,β-unsaturated carboxylic acid having 3 to 8 carbon atoms and α,β-unsaturated carboxylic acid ester, or a mixture thereof;

(B) a low melt viscosity ionomer resin having a melt viscosity (190° C.) ranging from 1 Pa·s to 10 Pa·s measured by a brookfield viscometer, and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, in a ratio of (A) the high melt viscosity resin/(B) the low melt viscosity ionomer resin being 55 mass % to 99 mass %/45 mass % to 1 mass %; and (C) a metal ion source capable of neutralizing carboxyl groups of (A) the high melt viscosity resin and (B) the low melt viscosity ionomer resin, in an amount of from 0.1 part to 10 parts with respect to 100 parts by mass of a sum of (A) the high melt viscosity resin and (B) the low melt viscosity ionomer resin.

In the present invention, since (B) the low melt viscosity ionomer resin which is a component for improving the fluidity is added to (A) the high melt viscosity resin, the fluidity of the golf ball forming resin composition improves. Further, since (B) the low melt viscosity ionomer resin has a similar structure to (A) the high melt viscosity resin containing (a-1) the high melt viscosity ionomer resin and/or (a-2) the high melt viscosity nonionic resin, the compatibility thereof is high. Thus, the bleed out of (b) the low melt viscosity ionomer resin is suppressed. Moreover, blending (C) the metal ion source enhances the neutralization degree of carboxyl groups of (A) the high melt viscosity resin and (B) the low melt viscosity ionomer resin, and thus the repulsion of the golf ball forming resin composition is improved. According to the present invention, as described above, the golf ball forming resin composition suppresses the bleed out of the low molecular weight material component, as well as improves the fluidity and repulsion performance.

The present invention further provides a golf ball comprising:

a core and a cover covering the core,
wherein the cover is formed from the above golf ball forming resin composition. If the golf ball forming resin composition of the present invention is used as the cover composition to form the cover, the golf ball excellent in the fluidity, the adhesion of the paint film and the repulsion is obtained.

The present invention further provides a golf ball comprising:

a core consisting of a center and at least one intermediate layer covering the center,
a cover covering the core, wherein at least one piece or one layer of the intermediate layer is formed from the above golf ball forming resin composition. If the golf ball forming resin composition of the present invention is used as the intermediate layer composition to form the intermediate layer, the fluidity and the repulsion of the intermediate layer composition is improved without lowering the adhesion of the intermediate layer to the center or the cover to provide a golf ball excellent in the adhesion between the layers and the repulsion of the intermediate layer.

The present invention further provides a method for producing a golf ball having a core and a cover covering the core, comprising, mixing (A) a high melt viscosity resin containing (a-1) a high melt viscosity ionomer resin having a melt viscosity (190° C.) ranging from 500 Pa·s to 100,000 Pa·s measured by a flow tester and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, and/or (a-2) a high melt viscosity nonionic resin having a melt viscosity (190° C.) ranging from 5 Pa·s to 3,000 Pa·s measured by a flow tester and consisting of a binary copolymer composed of ethylene and α,β-unsaturated carboxylic acid having 3 to 8 carbon atoms, a ternary copolymer composed of ethylene, α,β-unsaturated carboxylic acid having 3 to 8 carbon atoms and α,β-unsaturated carboxylic acid ester, or a mixture thereof;

(B) a low melt viscosity ionomer resin having a melt viscosity (190° C.) ranging from 1 Pa·s to 10 Pa·s measured by a brookfield viscometer, and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester with, or a mixture thereof, and (C) a metal ion source capable of neutralizing carboxyl groups of (A) the high melt viscosity resin and (B) the low melt viscosity ionomer resin, in a ratio of (A) the high melt viscosity resin/(B) the low melt viscosity ionomer resin being 55 mass % to 99 mass %/45 mass % to 1 mass %; and in an amount of (C) the metal ion source being from 0.1 part to 10 parts with respect to 100 parts by mass of a sum of (A) the high melt viscosity resin and (B) the low melt viscosity ionomer resin, thereby neutralizing carboxyl groups of (A) the high melt viscosity resin and (B) the low melt viscosity ionomer resin and preparing a golf ball forming resin composition; and molding a cover from the golf ball forming resin composition.

The present invention further provides a method for producing a golf ball having a core consisting of a center and at least one intermediate layer covering the center and a cover covering the core, comprising, mixing (A) a high melt viscosity resin containing (a-1) a high melt viscosity ionomer resin having a melt viscosity (190° C.) ranging from 500 Pa·s to 100,000 Pa·s measured by a flow tester and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, and/or (a-2) a high melt viscosity nonionic resin having a melt viscosity (190° C.) ranging from 5 Pa·s to 3,000 Pa·s measured by a flow tester and consisting of a binary copolymer composed of ethylene and α,β-unsaturated carboxylic acid having 3 to 8 carbon atoms, a ternary copolymer composed of ethylene, α,β-unsaturated carboxylic acid having 3 to 8 carbon atoms and α,β-unsaturated carboxylic acid ester, or a mixture thereof;

(B) a low melt viscosity ionomer resin having a melt viscosity (190° C.) ranging from 1 Pa·s to 10 Pa·s measured by a brookfield viscometer, and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, and (C) a metal ion source capable of neutralizing carboxyl groups of (A) the high melt viscosity resin and (B) the low melt viscosity ionomer resin, in a ratio of (A) the high melt viscosity resin/(B) the low melt viscosity ionomer resin being 55 mass % to 99 mass %/45 mass % to 1 mass %; and in an amount of (C) the metal ion source being from 0.1 part to 10 parts with respect to 100 parts by mass of a sum of (A) the high melt viscosity resin and (B) the low melt viscosity ionomer resin, thereby neutralizing carboxyl groups of (A) the high melt viscosity resin and (B) the low melt viscosity ionomer resin and preparing a golf ball forming resin composition;

molding an intermediate layer from the golf ball forming resin composition; and forming a cover from a cover composition onto the intermediate layer.

The present invention provides a golf ball excellent in the fluidity, the adhesion of the paint film, and the repulsion.

The present invention also provides a golf ball excellent in the adhesion between the layers and the repulsion of the intermediate layer by improving the fluidity and the repulsion of the intermediate layer composition without lowering the adhesion of the intermediate layer to the center or the cover.

DESCRIPTION OF THE PREFERRED
EMBODIMENT (1) Golf Ball Forming Resin Composition

The present invention provides a golf ball forming resin composition comprising as a resin component, (A) a high melt viscosity resin containing (a-1) a high melt viscosity ionomer resin having a melt viscosity (190° C.) ranging from 500 Pa·s to 100,000 Pa·s measured by a flow tester and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, and/or (a-2) a high melt viscosity nonionic resin having a melt viscosity (190° C.) ranging from 5 Pa·s to 3,000 Pa·s measured by a flow tester and consisting of a binary copolymer composed of ethylene and α,β-unsaturated carboxylic acid having 3 to 8 carbon atoms, a ternary copolymer composed of ethylene, α,β-unsaturated carboxylic acid having 3 to 8 carbon atoms and α,β-unsaturated carboxylic acid ester, or a mixture thereof;

(B) a low melt viscosity ionomer resin having a melt viscosity (190° C.) ranging from 1 Pa·s to 10 Pa·s measured by a brookfield viscometer, and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, in a ratio of (A) the high melt viscosity resin/(B) the low melt viscosity ionomer resin being 55 mass % to 99 mass %/45 mass % to 1 mass %; and (C) a metal ion source capable of neutralizing carboxyl groups of (A) the high melt viscosity resin and (B) the low melt viscosity ionomer resin, in an amount of from 0.1 part to 10 parts with respect to 100 parts by mass of a sum of (A) the high melt viscosity resin and (B) the low melt viscosity ionomer resin.

Herein, the melt viscosity (190° C.) of (A) the high melt viscosity resin is prescribed by the measurement value with a melt flow tester, and the melt viscosity (190° C.) of (B) the low melt viscosity ionomer resin is prescribed by the measurement value with a brookfield viscometer, respectively. This is because the appropriate measuring methods are employed depending upon the rage of the melt viscosity of each resin.

First, "the golf ball forming resin composition of the present invention" will be explained.

"(a-1) The high melt viscosity ionomer resin used as (A) the high melt viscosity resin" of the golf ball forming composition will be explained.

(a-1) The high melt viscosity ionomer resin preferably has a melt viscosity (190° C.) ranging from 500 Pa·s to 100,000 Pa·s measured by a flow tester and consists of one prepared by neutralizing at least a part of carboxyl groups in a binary copolymer composed of ethylene and α,β-unsaturated carboxylic acid having 3 to 8 carbon atoms with a metal ion, one prepared by neutralizing at least a part of carboxyl groups in a ternary copolymer composed of ethylene, α,β-unsaturated carboxylic acid having 3 to 8 carbon atoms, and α,β-unsaturated carboxylic acid ester with a metal ion, or a mixture thereof.

Examples of the α,β-unsaturated carboxylic acid having 3 to 8 carbon atoms are; acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable.

Examples of the metal ion for neutralizing at least a part of carboxyl groups of the binary copolymer composed of ethylene and α,β-unsaturated carboxylic acid having 3 to 8 carbon atoms, and the ternary copolymer composed of ethylene, α,β-unsaturated carboxylic acid having 3 to 8 carbon atoms, and α,β-unsaturated carboxylic acid ester include: monovalent alkali metal ions such as sodium, potassium, lithium, and the like; divalent metal ions such as magnesium, calcium, zinc, barium, cadmium, and the like; trivalent metal ions such as aluminum and the like; and other metal ions such as tin, zirconium, and the like. Among them, divalent metal ions such as magnesium, calcium, zinc, barium, cadmium are preferable, and zinc and magnesium are more preferable. The use of the divalent metal ion improves the durability and the low-temperature durability of the resultant golf ball.

(a-1) The high melt viscosity ionomer resin preferably contains one prepared by neutralizing at least a part of carboxyl groups in a binary copolymer composed of ethylene and (meth)acrylic acid with a metal ion, one prepared by neutralizing at least a part of carboxyl groups in a ternary copolymer composed of ethylene, (meth)acrylic acid, and (meth)acrylic acid ester with a metal ion, or a mixture thereof. Herein, "(meth)acrylic acid" means acrylic acid and/or methacrylic acid.

(a-1) The high melt viscosity ionomer resin more preferably contains an ionomer resin obtained by mixing (a-1-1) one prepared by neutralizing at least a part of carboxyl groups in a binary copolymer composed of ethylene and (meth) acrylic acid with a monovalent metal ion, or one prepared by neutralizing at least a part of carboxyl groups in a ternary copolymer composed of ethylene, (meth)acrylic acid, and (meth)acrylic acid ester with a monovalent metal ion, and (a-1-2) one prepared by neutralizing at least a part of carboxyl groups in a binary copolymer composed of ethylene and (meth)acrylic acid with a divalent metal ion, or one prepared by neutralizing at least a part of carboxyl groups in a ternary copolymer composed of ethylene, (meth)acrylic acid, and (meth)acrylic acid ester with a divalent metal ion.

The use of the above described mixture of the ionomer resins enhances the repulsion resilience of the golf ball forming resin composition. Examples of the monovalent metal ions are sodium, potassium, lithium, rubidium, cesium, and francium and examples of the divalent metal ions are magnesium, calcium, zinc, beryllium, strontium, barium, and radium. In this case, the blending ratio (a-1-1)/(a-1-2) is preferably 20 mass % to 80 mass %/80 mass % to 20 mass %, more preferably 25 mass % to 77 mass %/75 mass % to 23 mass %, even more preferably 30 mass % to 75 mass %/70 mass % to 25 mass %.

The content of $\alpha,\beta$-unsaturated carboxylic acid having 3 to 8 carbon atoms in (a-1) the high melt viscosity ionomer resin is preferably 2 mass % or more, more preferably 3 mass % or more, and is preferably 30 mass % or less, more preferably 25 mass % or less.

The degree of neutralization of the carboxyl groups of the (a-1) the high melt viscosity ionomer resin is preferably 20 mole % or more, more preferably 30 mole % or more, and is preferably 90 mole % or less, more preferably 85 mole % or less. If the degree of the neutralization is 20 mole % or more, the repulsion and durability of the golf ball improves, while if the degree of the neutralization is 90 mole % or less, the fluidity of the golf ball forming composition improves (good moldability). The degree of neutralization of the carboxyl groups of the (a-1) the high melt viscosity ionomer resin can be calculated by the following mathematical expression.

Degree of neutralization (mole %) of (a-1) the high melt viscosity ionomer resin=(the number of moles of neutralized carboxyl groups of the high melt viscosity ionomer resin/the number of moles of all carboxyl groups contained in the high melt viscosity ionomer resin)×100

The melt viscosity (190° C.) of (a-1) the high melt viscosity ionomer resin measured by a flow tester is 500 Pa·s or more, preferably 1,000 Pa·s or more, more preferably 1,500 Pa·s or more and is 100,000 Pa·s or less, preferably 95,000 Pa·s or less, more preferably 92,000 Pa·s or less. If the melt viscosity is 500 Pa·s or more, the durability of the resultant golf ball is improved, and while if the melt viscosity is 100,000 Pa·s or less, the moldability of the golf ball forming resin composition is improved.

Specific examples which can be used for the (a-1) the high melt viscosity ionomer resin include trade name "Himilan (registered trademark) (e.g. Himilan 1555 (Na), Himilan 1605 (Na), Himilan 1702 (Zn), Himilan 1706 (Zn), Himilan 1707 (Na), Himilan AM7311 (Mg), Himilan AM7329 (Zn), Himilan 1856 (Na), Himilan 1855 (Zn), and the like)" commercially available from Du Pont-Mitsui Polychemicals Co., Ltd.

Further, ionomer resins commercially available from E.I. du Pont de Nemours and Company include trade name "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); Surlyn 6320 (Mg), Surlyn 8120 (Na), Surlyn 8320 (Na), Surlyn 9320 (Zn), Surlyn 9320W (Zn) as a ternary copolymerized ionomer; and the like)", "HPF 1000 (Mg), HPF 2000 (Mg)", and the like.

Further, ionomer resins commercially available from ExxonMobil Chemical Corporation include trade name "Iotek (registered trademark) (e.g. Iotek 8000 (Na), Iotek 8030 (Na), Iotek 7010 (Zn), Iotek 7030 (Zn), and the like)". Examples of a ternary copolymerized ionomer are "Iotek 7510 (Zn), Iotek 7520 (Zn)" and the like. It is noted that Na, Zn, Li, and Mg described in the parentheses after the trade names indicate metal types of neutralizing metal ions.

Next, "(a-2) The high melt viscosity nonionic resin used as (A) the high melt viscosity resin" of the golf ball forming composition will be explained.

(a-2) The high melt viscosity nonionic resin has a melt viscosity (190° C.) ranging from 5 Pa·s to 3,000 Pa·s measured by a flow tester and consists of a binary copolymer composed of ethylene and $\alpha,\beta$-unsaturated carboxylic acid having 3 to 8 carbon atoms, a ternary copolymer composed of ethylene, $\alpha,\beta$-unsaturated carboxylic acid having 3 to 8 carbon atoms and $\alpha,\beta$-unsaturated carboxylic acid ester, or a mixture thereof.

As the $\alpha,\beta$-unsaturated carboxylic acid having 3 to 8 carbon atoms, the same $\alpha,\beta$-unsaturated carboxylic acids having 3 to 8 carbon atoms constituting "(a-1) the high melt viscosity ionomer resin" can be exemplified.

Among them, (a-2) the high melt viscosity nonionic resin preferably consists of a binary copolymer composed of ethylene and (meth)acrylic acid, a ternary copolymer composed of ethylene, (meth)acrylic acid, and (meth)acrylic acid ester, or a mixture thereof.

The content of $\alpha,\beta$-unsaturated carboxylic acid having 3 to 8 carbon atoms in (a-2) the high melt viscosity nonionic resin is preferably 2 mass % or more, more preferably 3 mass % or more, and is preferably 30 mass % or less, more preferably 25 mass % or less.

The melt viscosity (190° C.) of (a-2) the high melt viscosity nonionic resin measured by a flow tester is 5 Pa·s or more, preferably 10 Pa·s or more, more preferably 15 Pa·s or more and is 3,000 Pa·s or less, preferably 2,800 Pa·s or less, more preferably 2,500 Pa·s or less. If the melt viscosity (190° C.) of (a-2) the high melt viscosity nonionic resin is 5 Pa·s or more, the durability of the resultant golf ball is improved, and while if the melt viscosity is 3,000 Pa·s or less, the moldability of the golf ball forming resin composition is improved.

Specific examples of (a-2) the high melt viscosity nonionic resin are an ethylene-methacrylic acid copolymer having a commercial name of "NUCREL (registered trademark) (e.g. NUCREL N1050H, NUCREL N2050H, NUCREL AN4318, NUCREL N1110H, NUCREL N0200H) or an ethylene-acrylic acid copolymer having a commercial name of "PRIMACOR (registered trademark)" 5990I" available from Dow Chemical Company.

As (A) the high melt viscosity resin, (a-1) the high melt viscosity ionomer resin and (a-2) the high melt viscosity nonionic resin may be used solely or in combination. In the case of using (a-1) the high melt viscosity ionomer resin and (a-2) the high melt viscosity nonionic resin in combination as (A) the high melt viscosity resin, the blending ratio of (a-1) the high melt viscosity ionomer resin to (a-2) the high melt viscosity nonionic resin is preferably 1 mass % to 90 mass % to 99 mass % to 10 mass %, more preferably 5 mass % to 80 mass %/95 mass % to 20 mass %, even more preferably 10 mass % to 70 mass %/90 mass % to 30 mass %. If the blending ratio falls within the above range, the moldability into the golf ball improves and especially it is easy to mold the thin-walled cover and intermediate layer.

Next, "(B) the low melt viscosity ionomer resin" used in the present invention will be explained.

(B) The low melt viscosity ionomer resin has a melt viscosity (190° C.) ranging from 1 Pa·s to 10 Pa·s measured by a brookfield viscometer, and preferably consists of one prepared by neutralizing at least a part of carboxyl groups in a binary copolymer composed of ethylene and α,β-unsaturated carboxylic acid having 3 to 8 carbon atoms with a metal ion, one prepared by neutralizing at least a part of carboxyl groups in a ternary copolymer composed of ethylene, α,β-unsaturated carboxylic acid having 3 to 8 carbon atoms and α,β-unsaturated carboxylic acid ester with a metal ion, or a mixture thereof.

As the α,β-unsaturated carboxylic acid having 3 to 8 carbon atoms, the same α,β-unsaturated carboxylic acids having 3 to 8 carbon atoms constituting "(a-1) the high melt viscosity ionomer resin" can be exemplified.

Examples of a metal ion used to neutralize a part of carboxyl group of the binary copolymer composed of ethylene and α,β-unsaturated carboxylic acid having 3 to 8 carbon atoms, and the ternary copolymer composed of ethylene, α,β-unsaturated carboxylic acid having 3 to 8 carbon atoms, α,β-unsaturated carboxylic acid ester include: monovalent metal ions such as sodium, potassium, lithium, and the like; divalent metal ions such as magnesium, calcium, zinc, barium, cadmium, and the like; trivalent metal ions such as aluminum and the like; and other metal ions such as tin, zirconium, and the like. These metal ions may be used solely or in combination of two or more thereof. Among these metal ions, (B) the low melt viscosity ionomer resin is preferably neutralized with the divalent metal ion such as magnesium, calcium, zinc, barium, cadmium, and the like.

The melt viscosity (190° C.) of (B) the low melt viscosity ionomer resin measured by a brookfield viscometer is preferably 1 Pa·s or more, more preferably 2 Pa·s or more, even more preferably 3 Pa·s or more, and is preferably 10 Pa·s or less, more preferably 9 Pa·s or less, even more preferably 8 Pa·s or less. If the melt viscosity (190° C.) of (B) the low melt viscosity ionomer resin is 1 Pa·s or more, the compatibility with (A) the high melt viscosity resin component becomes high and thus the durability of the resultant golf ball improves. While if the melt viscosity of (B) the low melt viscosity ionomer resin is 10 Pa·s or less, the improving effect of the fluidity of the golf ball forming resin composition becomes large.

The melt flow rate (190° C., 2.16 kg) of (B) the low melt viscosity ionomer resin is preferably 100 g/10 min or more, more preferably 150 g/10 min or more, and even more preferably 200 g/10 min or more, and is preferably 2,000 g/10 min or less, more preferably 1,900 g/10 min or less, and even more preferably 1,800 g/10 min or less. If the melt flow rate of (B) the low melt viscosity ionomer resin is 100 g/10 min or more, the improved effect of the fluidity of the golf ball forming resin composition is large, while if the melt flow rate is 2,000 g/10 min or less, the compatibility with (A) the high melt viscosity resin component becomes high and the durability of the resultant golf ball improves.

The content of α,β-unsaturated carboxylic acid having 3 to 8 carbon atoms in (B) the low melt viscosity ionomer resin is preferably 2 mass % or more, more preferably 3 mass % or more, and is preferably 30 mass % or less, more preferably 20 mass % or less.

The degree of neutralization of the carboxyl groups of (B) the low melt viscosity ionomer resin is preferably 10 mole % or more, more preferably 15 mole % or more, even more preferably 20 mole % or more, and even more preferably 100 mole %. The degree of neutralization of the carboxyl groups of (B) the low melt viscosity ionomer resin can be calculated by the following mathematical expression.

Degree of neutralization (mol %) of (B) the low melt viscosity ionomer resin=(the number of moles of carboxyl groups neutralized of the low melt viscosity ionomer resin/the total number of moles of carboxyl groups contained in the low melt viscosity ionomer resin)×100

Specific examples of (B) the low melt viscosity ionomer resin are "Aclyn (registered trade name) 201 (Ca)," "Aclyn246 (Mg)," and "Aclyn295 (Zn)" available from Honeywell Inc.

The blending ratio of (A) the high melt viscosity resin/(B) the low melt viscosity ionomer resin contained in the golf ball forming resin composition is preferably 55 mass % to 99 mass %/45 mass % to 1 mass %, more preferably 58 mass % to 90 mass %/42 mass % to 10 mass %, even more preferably 60 mass % to 85 mass %/40 mass % to 15 mass %. If the blending ratio falls within the above range, since the fluidity of the golf ball forming resin composition improves, it is possible to produce the thin-walled intermediate layer or cover. As a result, the repulsion and the durability of the resultant golf ball are improved.

Next, "(C) a metal ion source" used in the golf ball forming resin composition will be explained.

(C) The metal ion source is not limited, as long as it is a basic metal compound that can neutralize unneutralized carboxyl groups of the (A) the high melt viscosity resin and (B) the low melt viscosity ionomer resin. It is noted that (C) the metal ion source is not deemed as a resin component constituting the golf ball forming resin composition.

Examples of (C) the metal ion source are metal hydroxides such as magnesium hydroxide, calcium hydroxide, sodium hydroxide, lithium hydroxide, potassium hydroxide, copper hydroxide and the like; metal oxides such as magnesium oxide, calcium oxide, zinc oxide, copper oxide and the like; and metal carbonates such as magnesium carbonate, calcium carbonate, sodium carbonate, lithium carbonate, potassium carbonate and the like. These (C) metal ion sources may be used solely or in combination of at least two of them. Among them, metal hydroxides are preferable, and magnesium hydroxide and calcium hydroxide are particularly preferable.

The content of (C) the metal ion source in the golf ball forming resin composition is preferably 0.1 part or more, more preferably 0.2 part or more, even more preferably 0.3 part or more, and is preferably 10 parts or less, more preferably 9 parts or less, even more preferably 8 parts or less with respect to 100 parts by mass of a sum of (A) the high melt viscosity resin and (B) the low melt viscosity ionomer resin. If the content of (C) the metal ion source falls within the above range, the repulsion performance of the resultant golf ball improves more. Further, the moldability of the golf ball forming resin composition into the golf ball is also enhanced.

The content of (C) the metal ion source is preferably adjusted such that the degree of neutralization of all carboxyl groups of (A) the high melt viscosity resin and (B) the low melt viscosity ionomer resin is preferably 50 mole % or more, more preferably 75 mole % or more, even more preferably 80 mole % or more.

In a preferable embodiment of the present invention, the resin component of the golf ball forming resin composition essentially consists of (A) the high melt viscosity resin and (B) the low melt viscosity ionomer resin. However, in another preferable embodiment, the golf ball forming resin composition may further contain (D) a thermoplastic resin and/or thermosetting resin in addition to (A) the high melt viscosity resin and (B) the low melt viscosity ionomer resin, unless the effect of the present invention is impaired.

In this case, the content of (D) the thermoplastic resin and/or thermosetting resin is preferably more than 0 part, more preferably 1 part or more, even more preferably 5 parts or more, and is preferably 100 parts or less, more preferably 70 parts or less, even more preferably 50 parts or less with respect to 100 parts by mass of a sum of (A) the high melt viscosity resin and (B) the low melt viscosity ionomer resin. If the content of (D) the thermoplastic resin and/or thermosetting resin falls within the above range, the desired properties such as the hardness or the repulsion performance of the golf ball forming resin composition is easily obtained.

Examples of (D) the thermoplastic resin and/or thermosetting resin are a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark)" and a thermoplastic polyester elastomer having a commercial name of "Primalloy (registered trademark) (e.g. "Primalloy A1500")" commercially available from Mitsubishi Chemical Corporation; a polyurethane elastomer having a commercial name of "Elastollan (registered trademark) (e.g. "Elastollan ET880")" commercially available from BASF Japan Ltd; thermosetting resins such as the resin obtained by crosslinking a rubber composition with a sulfur or an organic peroxide, a thermosetting polyurethane, an epoxy resin, and a phenol resin.

In the present invention, in addition to the aforementioned resin component, the golf ball forming resin composition may further contain a pigment component such as a white pigment (for example, titanium oxide), a blue pigment (for example, ultramarine blue), a red pigment, and the like, a specific gravity adjusting agent such as zinc oxide, calcium carbonate, barium sulfate, and the like, a dispersant, an antioxidant, an ultraviolet absorber, a light stabilizer, a fluorescent material or a fluorescent brightener and the like, as long as they do not impair the effect of the present invention.

The amount of the white pigment (titanium oxide), with respect to 100 parts by mass of the resin component, is preferably 0.5 part by mass or more, more preferably 1 part by mass or more, and is preferably 10 parts by mass or less, more preferably 8 parts by mass or less. By causing the amount of the white pigment to be 0.5 part by mass or more, it is possible to impart the opacity to the intermediate layer or the cover. If the amount of the white pigment is more than 10 parts by mass, the durability of the resultant constituent member such as the intermediate layer or the cover may deteriorate.

In the present invention, the melt flow rate (190° C., 2.16 kg) of the golf ball forming resin composition is preferably 10 g/10 min or more, more preferably 15 g/10 min or more, and even more preferably 20 g/10 min or more, and is preferably 100 g/10 min or less, more preferably 95 g/10 min or less, and even more preferably 90 g/10 min or less. If the melt flow rate of the golf ball forming resin composition is 10 g/10 min or more, the moldability is enhanced and thus it is easy to mold the thin-walled constituent members such as the intermediate layer or the cover.

The golf ball forming resin composition preferably has a bending stiffness of 100 MPa or more, more preferably 110 MPa or more, even more preferably 120 MPa or more, and preferably has a bending stiffness of 450 MPa or less, more preferably 420 MPa or less, even more preferably 400 MPa or less. If the bending stiffness of the golf ball forming resin composition is 100 MPa or more, since the obtained golf ball has an outer-hard inner soft structure, the flight distance becomes great. On the other hand, if the bending stiffness is 450 MPa or less, the golf ball forming resin composition becomes appropriately soft and thus the shot feeling of the golf ball becomes good.

The golf ball forming resin composition preferably has a repulsion resilience of 40% or more, more preferably 41% or more, even more preferably 42% or more. If the repulsion resilience of the golf ball forming resin composition is 40% or more, the flight distance of the obtained golf ball becomes great. Herein, the bending stiffness and the repulsion resilience of the golf ball forming resin composition are measured by forming the golf ball forming resin composition into a sheet form. The method for the measurement is described later.

The golf ball forming resin composition preferably has a slab hardness of 20 or more, more preferably 25 or more, even more preferably 30 or more, and preferably has a slab hardness of 70 or less, more preferably 65 or less, even more preferably 60 or less in Shore D hardness. If the golf ball forming resin composition has a slab hardness of 20 or more, the stiffness of the resultant constituent members such as the intermediate layer or the cover is enhanced, and thus the golf ball excellent in the repulsion (flight distance) is obtained. On the other hand, if the golf ball forming resin composition has a slab hardness of 70 or less, the durability of the resultant golf ball is more enhanced. Herein, the slab hardness of the golf ball forming resin composition is a measured hardness of the golf ball forming resin composition that is molded into a sheet form by a measuring method described later.

The melt flow rate, bending stiffness, repulsion resilience and the slab hardness of the golf ball forming resin composition can be adjusted by appropriately selecting a combination of (A) the high melt viscosity resin, (B) the low melt viscosity ionomer resin, (C) the metal ion source, and (D) the thermoplastic resin and/or thermosetting resin, and an amount of the additives.

(2) Golf Ball

The golf ball of the present invention is not limited, as long as it comprises a constituent member formed from the golf ball forming resin composition of the present invention. For example, in a preferable embodiment, the golf ball of the present invention comprises a core and a cover covering the core, wherein the cover is formed from the above golf ball forming resin composition. In another preferable embodiment, the golf ball of the present invention comprises a core consisting of a center and at least one intermediate layer covering the center, a cover covering the core, wherein at least one piece or one layer of the intermediate layer is formed from the above golf ball forming resin composition.

The preferable core of the golf ball of the present invention is explained. The core of the golf ball of the present invention includes, for example, a single-layered core, a core consisting of a center and a single-layered intermediate layer covering the center, a core consisting of a center and at least one intermediate layer covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

As the center or the single-layered core of the golf ball of the present invention, a conventionally known rubber composition (hereinafter simply referred to as "center rubber composition" occasionally) may be employed, and it can be molded by, for example, heat-pressing a rubber composition containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. If the amount is less than 0.2 part by mass, the center or the single-layered core become too soft, and the repulsion tends to be lowered, and if the amount is more than 3 parts by mass, the amount of the co-crosslinking agent must be increased in order to obtain the appropriate hardness, which tends to cause the insufficient repulsion.

The co-crosslinking agent is not particularly limited as long as it serves to crosslink a rubber molecule by graft polymerization with a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high repulsion.

The amount of the co-crosslinking agent to be used is preferably 10 parts or more, more preferably 20 parts or more, and is preferably 50 parts or less, more preferably 40 parts or less, based on 100 parts of the base rubber by mass. If the amount of the co-crosslinking agent to be used is less than 10 parts by mass, the amount of the crosslinking initiator must be increased to obtain an appropriate hardness, which tends to lower the repulsion. On the other hand, if the amount of the co-crosslinking agent to be used is more than 50 parts by mass, the center or the single-layered core becomes too hard, so that the shot feeling may be lowered.

The filler contained in the center rubber composition is mainly blended as a specific gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and is preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the repulsion tends to be lowered.

As the center rubber composition, an organic sulfur compound, an antioxidant or a peptizing agent may be blended appropriately in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide, a mono-substituted diphenyl disulfide such as bis (4-chlorophenyl) disulfide, bis(3-chlorophenyl) disulfide, bis (4-bromophenyl) disulfide, bis(3-bromophenyl) disulfide, bis (4-fluorophenyl) disulfide, bis(4-iodophenyl) disulfide and bis(4-cyanophenyl) disulfide; a di-substituted diphenyl disulfide such as bis(2,5-dichlorophenyl) disulfide, bis(3,5-dichlorophenyl) disulfide, bis(2,6-dichlorophenyl) disulfide, bis(2,5-dibromophenyl) disulfide, bis(3,5-dibromophenyl) disulfide, bis(2-chloro-5-bromophenyl) disulfide, and bis(2-cyano-5-bromophenyl) disulfide; a tri-substituted diphenyl disulfide such as bis(2,4,6-trichlorophenyl) disulfide, and bis (2-cyano-4-chloro-6-bromophenyl) disulfide; a tetra-substituted diphenyl disulfide such as bis(2,3,5,6-tetra chlorophenyl) disulfide; a penta-substituted diphenyl disulfide such as bis(2,3,4,5,6-pentachlorophenyl) disulfide and bis(2,3,4,5,6-pentabromophenyl) disulfide. These diphenyl disulfides or the derivative thereof can enhance repulsion by having some influence on the state of vulcanization of vulcanized rubber. Among them, diphenyl disulfide and bis(pentabromophenyl) disulfide are preferably used since a golf ball having particularly high repulsion can be obtained. The amount of the diphenyl disulfide or the derivative thereof to be blended is preferably 0.1 part by mass or more, more preferably 0.3 part by mass or more, and is preferably 5.0 parts by mass or less, more preferably 3.0 parts by mass or less relative to 100 parts by mass of the base rubber. The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The diameter of the core of the golf ball of the present invention is preferably 39.0 mm or more, more preferably 39.5 mm or more, and even more preferably 40.8 mm or more. If the diameter of the core is less than 39.0 mm, the cover becomes excessively thick and hence the repulsion of the golf ball may deteriorate. Further, the diameter of the core is preferably 42.2 mm or less, more preferably 42.0 mm or less, and even more preferably 41.8 mm or less. If the diameter of the core is more than 42.2 mm, the thickness of the cover becomes relatively thin, and hence a protection effect of the cover is not obtained sufficiently.

When the core has a diameter from 39.0 mm to 42.2 mm, a compression deformation amount (shrinking deformation amount of the core along the compression direction) of the core when applying a load from 98 N as an initial load to 1275 N as a final load is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is less than 1.90 mm, the core becomes too hard, resulting in the poor shot feeling, while if the compression deformation amount is more than 4.00 mm, the core becomes too soft, resulting in the heavy shot feeling.

The center hardness of the core is preferably 30 or larger, more preferably 32 or larger, and even more preferably 35 or larger in Shore D hardness. If the center hardness is smaller than 30 in Shore D hardness, the core becomes so soft that the repulsion of the golf ball tends to be lower. The center hardness of the core is preferably 50 or smaller, more preferably 48 or smaller, and even more preferably 45 or smaller in Shore D hardness. If the center hardness is more than 50 in Shore D hardness, the core becomes too hard, resulting in the poor shot feeling. In the present invention, the center hardness of the core is the hardness measured with the Shore D type spring hardness tester at the central point of a cut plane of a core which has been cut into two halves.

The surface hardness of the core is preferably 20 or larger, more preferably 25 or larger, and even more preferably 30 or larger in Shore D hardness. If the surface hardness is less than 20 in Shore D hardness, the core becomes so soft and the repulsion may be lowered. The surface hardness of the core is preferably 70 or smaller, more preferably 69 or smaller, and even more preferably 68 or smaller in shore D hardness. If the surface hardness is more than 70 in Shore D hardness, the core becomes so hard and the shot feeling may be lowered.

In the present invention, depending upon the objects, the core having the surface hardness larger than the center hardness, or the core having the center hardness larger than the surface hardness may be used as the core. For example, the surface hardness of the core is easily made larger than or smaller than the center hardness of the core by employing a multi-layered core structure.

In the case of using the relatively hard material for the cover covering the core (for example, the cover composition has a slab hardness of 50 or more in Shore D hardness), the shot feeling is improved by lowering the hardness of the intermediate layer. In the case of using the relatively soft material for the cover covering the core (for example, the cover composition has a slab hardness of less than 50 in Shore D hardness), the high launch angle and low spin rate on the driver shot or the like are achieved by increasing the hardness of the intermediate layer. As a result, the flight distance is improved.

In the case that the core has the surface hardness smaller than the center hardness, the hardness difference (center hardness—surface hardness) between the surface hardness and the center hardness of the core in the golf ball of the present invention is preferably 4 or larger, more preferably 7 or larger in Shore D hardness. If the surface hardness is smaller than the center hardness, the shot feeling of the golf ball is improved. Further, in this case, the hardness difference (center hardness—surface hardness) between the surface hardness and the center hardness of the core in the golf ball of the present invention is preferably 40 or less, more preferably 35 or less. If the hardness difference is too large, the durability of the golf ball may deteriorate.

In the case that the core has the surface hardness larger than the center hardness, the hardness difference (surface hardness−center hardness) between the surface hardness and the center hardness of the core in the golf ball of the present invention is preferably 4 or larger, more preferably 7 or larger in Shore D hardness. If the surface hardness is larger than of the center hardness, the launch angle becomes high and the spin rate becomes low, thereby improving the flight distance. Further, in this case, the hardness difference (surface hardness−center hardness) between the surface hardness and the center hardness of the core in the golf ball of the present invention is preferably 40 or less, more preferably 35 or less. If the hardness difference is too large, the durability of the golf ball may deteriorate.

In the case that the core consists of a center and at least one intermediate layer covering the center, the diameter of the center is preferably 34.8 mm or more, more preferably 35.0 mm or more, and even more preferably 35.2 mm or more, and is preferably preferably 41.2 mm or less, more preferably 41.0 mm or less, and even more preferably 40.8 mm or less. If the diameter of the center is 34.8 mm or more, the intermediate layer or the cover layer does not become excessively thick, and hence the repulsion of the golf ball becomes good. On the other hand, if the diameter of the center is 41.2 mm or less, the intermediate layer or the cover does not become excessively thin, and hence the intermediate layer or the cover functions well.

When the center has a diameter from 34.8 mm to 41.2 mm, a compression deformation amount (shrinking deformation amount of the center along the compression direction) of the center when applying a load from 98 N as an initial load to 1275 N as a final load is preferably 1.90 mm or more, more preferably 2.00 mm or more, even more preferably 2.10 mm or more, and is preferably 4.00 mm or less, more preferably 3.90 mm or less, even more preferably 3.80 mm or less. If the compression deformation amount is 1.90 mm or more, the shot feeling becomes good, while if the compression deformation amount is 4.00 mm or less, the repulsion becomes good.

The surface hardness of the center is preferably 45 or larger, more preferably 50 or larger, and even more preferably 55 or larger, and is preferably 65 or smaller, more preferably 62 or smaller, and even more preferably 60 or smaller in shore D hardness. If the surface hardness is 45 or more in Shore D hardness, the center does not become excessively soft and the repulsion becomes good. If the surface hardness of the center is 65 or less in Shore D hardness, the core does not become so hard and the shot feeling becomes good.

The intermediate layer is formed by an intermediate layer composition that comprises a resin component. The resin component includes, for example, in addition to the rubber composition described later and the ionomer resin described above, a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a polyurethane elastomer having a commercial name of "Elastollan (registered trademark) (e.g. "Elastollan XNY97A")" commercially available from BASF Japan Ltd; a thermoplastic polystyrene elastomer having a commercial name of "Rabalon (registered trademark) (e.g. "Rabalon T3221C")" commercially available from Mitsubishi Chemical Corporation. The resin composition may further contain a specific gravity adjusting agent such as barium sulfate and tungsten powder, an antioxidant, a pigment and the like. In the preferable embodiment, the golf ball forming resin composition of the present invention is used as the intermediate layer composition.

The thickness of the intermediate layer is preferably 2.0 mm or less, more preferably 1.8 mm or less, and even more preferably 1.6 mm or less, even more preferably 1.2 mm or less. If the thickness of the intermediate layer is 2.0 mm or less, the repulsion and shot feeling of the golf ball is improved. The thickness of the intermediate layer is preferably 0.1 mm or more, more preferably 0.3 mm or more, even more preferably 0.5 mm or more. If the thickness of the intermediate layer is 0.1 mm or more, it is easier to mold the intermediate layer. Further, the durability of the resultant golf ball is enhanced.

The intermediate layer composition preferably has a slab hardness of 20 or more, more preferably 25 or more, even more preferably 30 or more, and preferably has a slab hardness of 70 or less, more preferably 65 or less, even more preferably 60 or less in Shore D hardness. If the intermediate layer composition has a slab hardness of 20 or more, the stiffness of the resultant intermediate layer is enhanced and thus the golf ball having a good repulsion is obtained. On the other hand, if the intermediate layer composition has a slab hardness of 70 or less, the durability of the resultant golf ball is improved more. Herein, the slab hardness of the intermediate layer composition is a measured hardness of the intermediate layer composition that is molded into a sheet form by a measuring method described later.

Next, the cover of the golf ball of the present invention will be explained.

The cover of the golf ball of the present invention is formed from a cover composition containing a resin component. The resin component includes, for example, in addition to the conventional ionomer resin, a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a polyurethane elastomer having a commercial name of "Elastollan (registered trademark) (e.g. "Elastollan XNY97A")" commercially available from BASF Japan Ltd; a thermoplastic polystyrene elastomer having a commercial name of "Rabalon (registered trademark) (e.g. "Rabalon T3221C")" commercially available from Mitsubishi Chemical Corporation. These resin components are used solely or in combination of at least two of them. Among them, in view of the repulsion, the resin component preferably includes a mixture of the ionomer resin and a thermoplastic polystyrene elastomer. In a preferable embodiment, the golf ball forming resin composition of the present invention is used as the cover composition.

In the present invention, in addition to the aforementioned resin component, the cover composition may further contain a pigment component such as a white pigment (for example, titanium oxide), a blue pigment (for example, ultramarine blue), a red pigment, and the like, a specific gravity adjusting agent such as zinc oxide, calcium carbonate, barium sulfate, and the like, a dispersant, an antioxidant, an ultraviolet absorber, a light stabilizer, a fluorescent material or a fluorescent brightener and the like, as long as they do not impair the performance of the cover.

The amount of the white pigment (titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. By causing the amount of the white pigment to be 0.5 parts by mass or more, it is possible to impart the opacity to the cover. If the amount of the white pigment is more than 10 parts by mass, the durability of the cover may deteriorate.

The cover composition preferably has a slab hardness of 70 or less, more preferably 65 or less, even more preferably 60 or less in Shore D hardness. If the cover composition has a slab hardness of 70 or less, the spin rate stability on the approach shots with short irons is improved. As a result, the golf ball having a good controllability on the approach shots is obtained. In order to ensure the spin rate sufficiently for the approach shots, the cove composition preferably has a slab hardness of 20 or more, more preferably 25 or more, even more preferably 30 or more in Shore D hardness.

In the present invention, the thickness of the cover of the golf ball is preferably 2.0 mm or less, more preferably 1.6 mm or less, and even more preferably 1.2 mm or less. This is because by causing the thickness of the cover to be 2.0 mm or less, the desirable repulsion and shot feeling are obtained. The thickness of the cover is preferably 0.1 mm or more, more preferably 0.2 mm or more, and even more preferably 0.3 mm or more. This is because if the thickness of the cover is less than 0.1 mm, it may become difficult to mold the cover. In addition, the durability and the abrasion resistance of the cover may deteriorate.

In one preferable embodiment of the present invention, the golf ball comprises a core and a cover, wherein the cover is formed from the golf ball forming resin composition of the present invention.

In another preferable embodiment of the present invention, the golf ball comprises a core consisting of a center and at least one intermediate layer covering the center, and a cover covering the core, wherein at least one piece or one layer of the intermediate layer is formed from the above golf ball forming resin composition of the present invention. Specific example of these preferable embodiments are a three-piece golf ball having a core consisting of a center and an intermediate layer covering the center, and a cover covering the core; a four-piece golf ball comprising a core consisting of a center and two intermediate layers covering the center, and the cover covering the core; a multi-piece golf ball having a multi-piece core consisting of a center and multi-piece or multi-layer of intermediate layers covering the center, and a cover covering the core.

The present invention can be preferably applied to the three-piece golf ball having a core consisting of a center and an intermediate layer covering the center, and a cover covering the core, wherein the intermediate layer is formed from the golf ball forming resin composition.

It is noted that when the core includes a center and multi-piece of intermediate layers or multi-layer of intermediate layers covering the center, the core may include an intermediate layer which is formed from an intermediate layer composition different from the golf ball forming resin composition of the present invention, as long as it does not impair the effects of the present invention. In this case, it is preferred that the outermost layer of the core is an intermediate layer formed from the golf ball forming resin composition of the present invention, and it is much preferred that all the multi-piece of intermediate layers or multi-layer of intermediate layers are formed from the golf ball forming resin composition of the present invention.

When the golf ball of the present invention has a diameter in a range from 40 mm to 45 mm, a compression deformation amount of the golf ball (an amount of compression of the golf ball in the compression direction thereof) when applying an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. If the compression deformation amount is 4.0 mm or less, the repulsion is enhanced.

When preparing a wound golf ball in the present invention, a wound core may be used as the core. In that case, for example, a wound core comprising a center formed by curing the above core rubber composition and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

The present invention may further include a painted golf ball that comprises a golf ball body consisting of a core and a cover covering the core and a paint film covering the golf ball body.

The resin component constituting the paint film includes, without limitation, an acrylic resin, an epoxy resin, a polyurethane resin, a polyester resin, a cellulose resin. Among them, the two part curing type polyurethane resin described later is preferably used. The use of the two part curing type polyurethane resin provides a paint film with a more excellent durability.

The two part curing type polyurethane resin is a polyurethane resin that is cured by reacting a base material and a curing agent. For example, the two part curing type polyurethane resin is obtained by curing the base material containing a polyol component with a polyisocyanate compound or a derivative thereof. The base material containing the polyol component preferably contains a urethane polyol, which is obtained by reacting the polyisocyanate compound with the polyol.

The paint film preferably has a thickness of, but not limited to, 5 μm or larger, and more preferably 7 μm or larger, and preferably has a thickness of 25 μm or smaller, and more preferably 18 μm or smaller. This is because if the thickness is smaller than 5 μm, the paint film is easy to wear off due to continued use of the golf ball, and if the thickness is larger than 25 μm, the effect of the dimples is reduced, resulting in the low flying performance of the golf ball.

(3) Method of Producing Golf Ball

Next, the method of producing the golf ball of the present invention will be described.

The present invention further provides a method for producing a golf ball having a core and a cover covering the core, comprising, mixing (A) a high melt viscosity resin containing (a-1) a high melt viscosity ionomer resin having a melt viscosity (190° C.) ranging from 500 Pa·s to 100,000 Pa·s measured by a flow tester and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, and/or (a-2) a high melt viscosity nonionic resin having a melt viscosity (190° C.) ranging from 5 Pa·s to 3,000 Pa·s measured by a flow tester and consisting of a binary copolymer composed of ethylene and α,β-unsaturated carboxylic acid having 3 to 8 carbon atoms, a ternary copolymer composed of ethylene, α,β-unsaturated carboxylic acid having 3 to 8 carbon atoms and α,β-unsaturated carboxylic acid ester, or a mixture thereof;

(B) a low melt viscosity ionomer resin having a melt viscosity (190° C.) ranging from 1 Pa·s to 10 Pa·s measured by a brookfield viscometer, and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, and (C) a metal ion source capable of neutralizing carboxyl groups of (A) the high melt viscosity resin and (B) the low melt viscosity ionomer resin, in a ratio of (A) the high melt viscosity resin/(B) the low melt viscosity ionomer resin being 55 mass % to 99 mass %/45 mass % to 1 mass %; and in an amount of (C) the metal ion source being from 0.1 part to 10 parts with respect to 100 parts by mass of a sum of (A) the high melt viscosity resin and (B) the low melt viscosity ionomer resin, thereby neutralizing carboxyl groups of (A) the high melt viscosity resin and (B) the low melt viscosity ionomer resin and preparing a golf ball forming resin composition; and molding a cover from the golf ball forming resin composition.

The present invention further provides a method for producing a golf ball having a core consisting of a center and at least one intermediate layer covering the center and a cover covering the core, comprising, mixing (A) a high melt viscosity resin containing (a-1) a high melt viscosity ionomer resin having a melt viscosity (190° C.) ranging from 500 Pa·s to 100,000 Pa·s measured by a flow tester and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, and/or (a-2) a high melt viscosity nonionic resin having a melt viscosity (190° C.) ranging from 5 Pa·s to 3,000 Pa·s measured by a flow tester and consisting of a binary copolymer composed of ethylene and α,β-unsaturated carboxylic acid having 3 to 8 carbon atoms, a ternary copolymer composed of ethylene, α,β-unsaturated carboxylic acid having 3 to 8 carbon atoms and α,β-unsaturated carboxylic acid ester, or a mixture thereof;

(B) a low melt viscosity ionomer resin having a melt viscosity (190° C.) ranging from 1 Pa·s to 10 Pa·s measured by a brookfield viscometer, and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, and (C) a metal ion source capable of neutralizing carboxyl groups of (A) the high melt viscosity resin and (B) the low melt viscosity ionomer resin, in a ratio of (A) the high melt viscosity resin/(B) the low melt viscosity ionomer resin being 55 mass % to 99 mass %/45 mass % to 1 mass %; and in an amount of (C) the metal ion source being from 0.1 part to 10 parts with respect to 100 parts by mass of a sum of (A) the high melt viscosity resin and (B) the low melt viscosity ionomer resin, thereby neutralizing carboxyl groups of (A) the high melt viscosity resin and (B) the low melt viscosity ionomer resin and preparing a golf ball forming resin composition;

molding an intermediate layer from the golf ball forming resin composition; and forming a cover from a cover composition onto the intermediate layer.

Examples of methods for preparing the golf ball forming resin composition are a method of mixing, with an extruder, (A) the high melt viscosity resin containing (a-1) the high melt viscosity ionomer resin and/or (a-2) the high melt viscosity nonionic resin, (B) the low melt viscosity ionomer resin, and (C) the metal ion source at the same time, and a method of mixing, with an extruder provided with a side feeder, (A) the high melt viscosity resin containing (a-1) the high melt viscosity ionomer resin and/or (a-2) the high melt viscosity nonionic resin with (B) the low melt viscosity ionomer resin prior to feeding and mixing (C) the metal ion source from the side feeder.

The intermediate layer is, for example, formed by covering the center with the intermediate layer composition. An embodiment for molding the intermediate layer is not particularly limited, and includes an embodiment which comprises injection molding the intermediate layer composition directly onto the center, or an embodiment which comprises molding the intermediate layer composition into a hollow-shell, covering the center with a plurality of the hollow-shells and subjecting the center with a plurality of the hollow shells to the compression-molding (preferably an embodiment which comprises molding the intermediate layer composition into a half hollow-shell, covering the center with the two half hollow-shells, and subjecting the center with the two half hollow-shells to the compression-molding).

In the case of directly injection molding the intermediate layer composition onto the center, it is preferred to use upper and lower molds for forming the intermediate layer having a spherical cavity and pimples, wherein a part of the pimple also serves as a retractable hold pin. When forming the intermediate layer by injection molding, the hold pin is protruded to hold the center, and the intermediate layer composition which has been heated and melted is charged and then cooled to obtain the intermediate layer. For example, the intermediate layer composition heated and melted at the temperature of 150° C. to 230° C. is charged into a mold held under the pressure of 980 KPa to 1,500 KPa for 0.1 to 1 second. After cooling for 15 to 60 seconds, the mold is opened.

When molding the intermediate layer in a compression molding method, molding of the half shell can be performed by either compression molding method or injection molding method, and the compression molding method is preferred. The compression-molding of the intermediate layer composition into half shell can be carried out, for example, under a pressure of 1 MPa or more and 20 MPa or less at a temperature of −20° C. or more and 70° C. or less relative to the flow beginning temperature of the intermediate layer composition. By performing the molding under the above conditions, a half shell having a uniform thickness can be formed. Examples of a method for molding the intermediate layer using half shells include compression molding by covering the center with two half shells. The compression molding of half shells into the intermediate layer can be carried out, for example, under a pressure of 0.5 MPa or more and 25 MPa or less at a temperature of −20° C. or more and 70° C. or less relative to the flow beginning temperature of the intermediate layer composition.

By performing the molding under the above conditions, the intermediate layer having a uniform thickness can be formed.

The center is formed from the center rubber composition described above. The conditions for press-molding the center rubber composition should be determined appropriately depending on the rubber composition. The press-molding is preferably carried out for 10 to 60 minutes at the temperature of 130° C. to 200° C. under the pressure of 2.9 MPa to 11.8 MPa. For example, the press-molding is preferably carried out at the temperature from 130° C. to 200° C. for 10 to 40 minutes. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

The cover is formed, for example, by covering the single-layered core or multi-layered core with the cover composition. An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 230° C. is charged into a mold held under the pressure of 980 KPa to 1,500 KPa for 0.1 to 1 second. After cooling for 15 to 60 seconds, the mold is opened and the golf ball with the cover molded is taken out from the mold.

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed.

The molding temperature means the highest temperature where the temperature at the surface of the concave portion of the lower mold reaches from closing through opening the molds. Further, the flow beginning temperature of the golf ball forming resin composition can be measured in a pellet form under the following conditions by using a flow characteristics evaluation apparatus (Flow Tester CFT-500D, manufactured by Shimadzu Corporation). Measuring conditions: Area size of a plunger: 1 cm², Die length: 1 mm, Die diameter: 1 mm, Load: 588.399 N, Start temperature: 30° C., and Temperature increase rate: 3° C./min.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed.

In the case that the golf ball of the present invention is a painted golf ball, there is a step for forming a paint film. The paint film is, for example, formed by applying a paint to the surface of the golf ball body and drying the paint.

The method of applying the paint is not specifically limited, and includes a conventional method well known for coating the two-component type paint comprising a base material and a curing agent, such as air gun spray coating, brush coating, electrostatic coating and the like. When the paint is applied by coating with an air spray gun, the paint may be prepared by mixing the base material and the curing agent bit by bit, or by feeding the base material and the curing agent with respective pumps and continuously mixing them in a constant ratio through the line mixer such as a static mixer located in the stream line just before the spray gun. Alternatively, the base material and the curing agent can be air-sprayed respectively with the spray gun having the device for controlling the mixing ratio thereof.

The method of drying a paint is not limited. The paint is, for example, dried in an oven.

EXAMPLES

Hereinafter, the present invention will be described in detail by way of example. The present invention is not limited to examples described below. Various changes and modifications can be made without departing from the spirit and scope of the present invention.

(1) Hardness of Center and Core (Shore D Hardness)

A type P1 auto loading durometer manufactured by Kobunshi Keiki Co., Ltd., provided with a Shore D type spring hardness tester prescribed in ASTM-D2240 was used to measure the surface hardness and the center hardness of the center and the core. Shore D hardness measured at the surfaces of the center and the core are defined as the surface hardness of the center and the core, respectively. The core was cut into two hemispheres to obtain a cut plane, and a Shore D hardness measured at the center of the cut plane was used as the center hardness of the core.

(2) Compression Deformation Amount (mm)

A compression deformation amount of the center, core and golf ball (a shrinking amount of the center, core, and golf ball in the compression direction thereof), when applying a load from 98 N as an initial load to 1275 N as a final load to the center, core and golf ball, was measured.

(3) Melt Viscosity Measure by a Flow Tester

The melt viscosity of a pellet-form sample was measured under the following conditions by using a flow characteristics evaluation apparatus (Flow Tester CFT-500D, manufactured by Shimadzu Corporation).

Measuring Conditions
Die length: 1 mm
Die diameter: 1 mm
Load: 294 N
Temperature: 190° C.

(4) Melt Viscosity (Pa·s) Measured by a Brookfield Viscometer

The melt viscosity of (B) the low melt viscosity ionomer resin heated at the temperature of 190° C. was measured by a brookfield viscometer (BL type viscometer available from Tokyo Keiki Inc.). Rotor No. 4 was used at a rotation speed of 6 rpm.

(5) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. and the load of 2.16 kg.

(6) Slab Hardness (Shore D Hardness)

Sheets with a thickness of about 2 mm were produced by injection molding the cover composition and the intermediate layer composition, and stored at 23° C. for two weeks. Three or more of these sheets were stacked on one another so as not to be affected by the measuring substrate on which the sheets were placed, and the stack was measured with a type P1 auto loading durometer manufactured by Kobunshi Keiki Co., Ltd., provided with a Shore D type spring hardness tester prescribed in ASTM-D2240.

(7) Bending Stiffness (MPa)

A sheet with a thickness of about 2 mm was produced by injection molding the cover composition and the intermediate layer composition, and stored at 23° C. for two weeks. The bending stiffness was measured according to JIS K7106. The measurement was conducted under the conditions of the temperature 23° C. and humidity 50 RH %.

(8) Repulsion Resilience

A sheet with a thickness of about 2 mm was produced by a hot press molding from the cover composition and the intermediate layer composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type repulsion resilience test (testing temperature 23° C., humidity 50 RH %). Preparation of the test piece and the testing method are based on JIS K6255.

(9) Coefficient of Repulsion for Golf Balls No. 18 to No. 35.

A 198.4 g of metal cylindrical object was forced to collide with each golf ball at a speed of 40 msec, and the speeds of the cylindrical object and the golf ball before and after the collision were measured. Based on these speeds and the mass of each object, coefficient of repulsion for each golf ball was calculated. The measurement was conducted by using twelve of each golf ball, and the average value was regarded as the coefficient of repulsion for the golf ball. The coefficient of repulsion of golf ball No. 29 was defined as an index of 100.0, and the coefficient of repulsion of each golf ball was represented by converting the coefficient of repulsion of each golf ball into this index.

(10) Adhesion of Paint Film (Durability of Paint film)

Each painted golf ball was hit 100 times repeatedly with a driver (1 W) attached to a swing robot manufactured by TRUETEMPER CO, at the head speed of 45 msec. The degree of the peeling off of the paint film was observed and evaluated based on the following criteria.

E(Excellent): The paint film did not peel off at all.
G(Good): The area where the paint film peeled off was less than 1 mm$^2$.
F(Fair): The area where the paint film peeled off was 1 mm$^2$ or more and less than 4 mm$^2$.
P(Poor): The area where the paint film peeled off was 4 mm$^2$ or more.

(11) Adhesion Between the Layers
Golf Ball Durability

A metal-head driver (W#1) was installed on a swing robot manufactured by TRUETEMPER CO, and the head speed was set to 45 msec. Each golf ball was stored in a constant temperature reservoir kept at the temperature of 23° C. for 12 hours. Immediately after taking each golf ball out of the reservoir, they were hit with the driver. This procedure was repeated, and the number of hits required to break the golf ball was counted. This measurement was conducted twelve times for each golf ball. The number of hits for golf ball No. 29 was defined as an index of 100, and the durability of each golf ball was represented by converting the number of hits for each golf ball into this index. A greater index value indicates that the durability of the golf ball is excellent.

Delaminating Ratio Between the Layers

For each golf ball, twelve golf balls broken in the above durability test were dismantled and observed as to whether or not the layers are delaminated between the center and the intermediate layer, or the intermediate layer and the cover. Delaminating ratio was calculated according to the following equation.

Delaminating ratio (%)=100×(number of golf balls broken between the layers/total number of golf balls broken)

[Production of Golf Balls No. 1 to No. 17]
(1) Production of Center

The center rubber compositions having the formulations shown in Table 1 were kneaded and heat-pressed in upper and lower molds, each having a hemispherical cavity, at 170° C. for 15 minutes to prepare spherical centers. As Core No. B, the center is directly used. The amount of barium sulfate was adjusted appropriately to make a golf ball have a weight of 45.4 g.

(2) Preparation of Intermediate Layer Composition and Cover Composition

Blending materials shown in Tables 1 to 5 were mixed with a twin-screw kneading extruder to prepare the intermediate layer composition and cover compositions in the pellet form. The extruding conditions were a screw diameter of 45 mm, a screw rotational speed of 200 rpm, and screw L/D=35, and the mixtures were heated to 160 to 230° C. at the die position of the extruder.

TABLE 1

| | | Core No. | A | B |
|---|---|---|---|---|
| Center | Formulation | Polybutadiene | 100 | 100 |
| | | Zinc acrylate | 25 | 25 |
| | | Zinc oxide | 5 | 5 |
| | | Diphenyl disulfide | 0.5 | 0.5 |
| | | Dicumyl peroxide | 0.9 | 0.9 |
| | | Barium sulfate | Appropriate Amount*) | Appropriate Amount*) |

TABLE 1-continued

| | | Core No. | A | B |
|---|---|---|---|---|
| | Properties | Diameter (mm) | 38.8 | — |
| | | Compression deformation amount (mm) | 4.0 | — |
| | | Surface hardness (Shore D) | 49 | — |
| Intermediate layer | Formulation | Himilan 1555 | 30 | — |
| | | Himilan AM7329 | 30 | — |
| | | Rabalon T3221C | 40 | — |
| | | Titanium oxide | 4 | — |
| | Properties | Thickness (mm) | 1.0 | — |
| | | Slab hardness (Shore D) | 40 | — |
| Core Properties | | Diameter (mm) | 40.8 | 40.8 |
| | | Center hardness (Shore D) | 40 | 40 |
| | | Surface hardness (Shore D) | 46 | 49 |
| | | Compression deformation amount (mm) | 3.5 | 4.0 |

Formulation: parts by mass
*)Depending on the cover composition, adjustment was made such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Diphenyl disulfide: manufactured by Sumitomo Seika Chemicals Co., Ltd.
Dicumyl peroxide: "Percumyl (registered trademark) D" manufactured by NOF Corporation.
Himilan 1555: Sodium ion neutralized ethylene-methacrylic acid copolymer ionomer resin available from Du Pont-Mitsui Polychemicals Co., Ltd
Himilan AM7329: Zinc ion neutralized ethylene-methacrylic acid copolymer ionomer resin available from Du Pont-Mitsui Polychemicals Co., Ltd
Rabalon T3221C: Polystyrene elastomer available from Mitsubishi Chemical Corporation.

(3) Production of Golf Ball Body

The intermediate layer composition obtained above was injection-molded onto the center to form an intermediate layer covering the center and produce a spherical core. Subsequently, golf balls were produced by injection-molding the cover composition onto the spherical core to form a cover. Upper and lower molds have a spherical cavity with pimples, a part of which serves as a hold pin which is extendable and retractable. The hold pins were protruded to hold the core, the resin heated to 210° C. was charged into the mold under a pressure of 80 tons within 0.3 seconds, and cooled for 30 seconds. Then, the mold was opened, and the golf ball body was taken out from the mold. The surface of the obtained golf ball body were treated with sandblast, marked, and painted with a clear paint. As a clear paint, the following paint was used. The paint was dried in an oven at 40° C. to form a paint film having a thickness of 10 µm, and golf balls having a diameter of 42.8 mm and a mass of 45.4 g were obtained. The evaluation results of the obtained golf ball are shown in Tables 2 to 5.

[Preparation of Clear Paint]
(i) Base material: Urethane polyol 60 parts by mass of PTMG250 (BASF Co., polyoxytetramethyleneglycol having a molecular weight of 250), 54 parts by mass of 550U (Sumitomo-Bayer Urethane Co., Ltd, branched polyol having a molecular weight of 550) were dissolved into 120 parts by mass of the solvent (toluene and methylethylketone). The dibutyl-tin-dilaurylate was added in an amount of 0.1 mass % with respect to the total base material. While keeping this polyol at the temperature of 80° C., 66 parts by mass of isophorone diisocyanate was slow-added into the polyol to obtain a urethane polyol having a solid content of 60 mass %, hydroxyl value of 75 mg KOH/g, and a weight average molecular weight of 7808.

(ii) Curing agent: Isophorone diisocyanate available from Sumitomo-Bayer Urethane Co., LTD.
(iii) Mixing ratio: NCO (curing agent)/OH (base material) =1.2 molar ratio.

TABLE 2

| | | | Golf ball No. | 1 | 2 | 3 | 4 | 5 |
|---|---|---|---|---|---|---|---|---|
| Cover composition | Core No. | | | A | A | A | A | A |
| | Resin component | (A) Component (a-1) | Himilan 1555(Na) | 30 | 35 | — | — | — |
| | | | Surlyn 8150(Na) | — | — | 35 | — | — |
| | | | Himilan AM7329(Zn) | 30 | 35 | — | — | 65 |
| | | | Surlyn 9150(Zn) | — | — | 35 | — | — |
| | | | Surlyn 6320(Mg) | — | — | — | 70 | — |
| | | | Himilan 1702(Zn) | — | — | — | — | — |
| | | (A) Component (a-2) | Nucrel 2050H | — | — | — | — | 25 |
| | | | Nucrel AN4318 | — | — | — | — | — |
| | | (B) component | Aclyn201(Ca) | — | — | — | 30 | — |
| | | | Aclyn295(Zn) | 40 | 30 | 30 | — | 10 |
| | | (D) component | Rabalon T3221C | — | — | — | — | — |
| | | | AC 540 | — | — | — | — | — |
| | | Fatty acid | Behenic acid | — | — | — | — | — |
| | | | Stearic acid | — | — | — | — | — |
| | | (C) component | $Mg(OH)_2$ | 1.7 | 2.0 | 2.2 | 0.7 | 1.8 |
| | | | $Ca(OH)_2$ | — | — | — | — | — |
| | Titanium oxide | | | 4 | 4 | 4 | 4 | 4 |
| | Properties | Melt flow rate (g/10 min) | | 25 | 17 | 13 | 11 | 16 |
| | | Slab hardness (Shore D) | | 60 | 60 | 67 | 45 | 60 |
| | | Bending stiffness (MPa) | | 200 | 210 | 220 | 35 | 205 |
| | | Repulsion resilience (%) | | 50 | 52 | 54 | 62 | 57 |
| Golf ball Properties | Cover thickness (mm) | | | 1.0 | 1.0 | 1.0 | 1.0 | 1.0 |
| | Cover hardness (Shore D) | | | 62 | 62 | 68 | 47 | 62 |
| | Compression deformation amount (mm) | | | 2.99 | 2.98 | 2.98 | 3.10 | 2.99 |
| | Paint adhesion | | | G | G | G | G | G |

Formulation: parts by mass,

TABLE 3

| | | | Golf ball No. | 6 | 7 | 8 | 9 | 10 |
|---|---|---|---|---|---|---|---|---|
| Cover composition | Core No. | | | A | A | A | A | B |
| | Resin component | (A) Component (a-1) | Himilan 1555(Na) | — | — | 40 | 30 | — |
| | | | Surlyn 8150(Na) | — | — | — | — | 35 |
| | | | Himilan AM7329(Zn) | — | — | — | 30 | — |
| | | | Surlyn 9150(Zn) | — | — | — | — | 35 |
| | | | Surlyn 6320(Mg) | 60 | — | — | — | — |
| | | | Himilan 1702(Zn) | — | — | 40 | — | — |
| | | (A) Component (a-2) | Nucrel 2050H | — | — | — | — | — |
| | | | Nucrel AN4318 | 10 | 60 | — | — | — |
| | | (B) component | Aclyn201(Ca) | 30 | 40 | 20 | — | — |
| | | | Aclyn295(Zn) | — | — | — | 40 | 30 |
| | | (D) component | Rabalon T3221C | — | — | — | 20 | — |
| | | | AC 540 | — | — | — | — | — |
| | | Fatty acid | Behenic acid | — | — | — | — | — |
| | | | Stearic acid | — | — | — | — | — |
| | | (C) component | $Mg(OH)_2$ | 0.6 | — | 2.4 | 1.7 | 2.2 |
| | | | $Ca(OH)_2$ | — | 3.9 | — | — | — |
| | Titanium oxide | | | 4 | 4 | 4 | 4 | 4 |
| | Properties | Melt flow rate (g/10 min) | | 12 | 10 | 9 | 22 | 13 |
| | | Slab hardness (Shore D) | | 46 | 50 | 63 | 48 | 67 |
| | | Bending stiffness (MPa) | | 38 | 110 | 182 | 90 | 220 |
| | | Repulsion resilience (%) | | 60 | 61 | 56 | 50 | 54 |
| Golf ball Properties | Cover thickness (mm) | | | 1.0 | 1.0 | 1.0 | 1.0 | 1.0 |
| | Cover hardness (Shore D) | | | 48 | 52 | 64 | 50 | 69 |
| | Compression deformation amount (mm) | | | 3.10 | 3.04 | 3.00 | 3.15 | 3.50 |
| | Paint adhesion | | | G | G | G | G | G |

Formulation: parts by mass

TABLE 4

| | | | Golf ball No. | 11 | 12 | 13 | 14 | 15 |
|---|---|---|---|---|---|---|---|---|
| Cover composition | Core No. | | | A | A | A | A | A |
| | Resin component | (A) Component (a-1) | Himilan 1555(Na) | 30 | 30 | 50 | 45 | — |
| | | | Surlyn 8150(Na) | — | — | — | — | 35 |
| | | | Himilan AM7329(Zn) | 30 | 30 | 50 | 45 | — |
| | | | Surlyn 9150(Zn) | — | — | — | — | 35 |
| | | | Surlyn 6320(Mg) | — | — | — | — | — |
| | | | Himilan 1702(Zn) | — | — | — | — | — |
| | | (A) Component (a-2) | Nucrel 2050H | — | — | — | — | — |
| | | | Nucrel AN4318 | — | — | — | — | — |
| | | (B) component | Aclyn201(Ca) | — | — | — | — | — |
| | | | Aclyn295(Zn) | 40 | — | — | — | — |
| | | (D) component | Rabalon T3221C | — | — | — | — | — |
| | | | AC 540 | — | — | — | 10 | — |
| | | Fatty acid | Behenic acid | — | 40 | — | — | — |
| | | | Stearic acid | — | — | — | — | 30 |
| | | (C) component | $Mg(OH)_2$ | — | 1.7 | 2.8 | 2.5 | 2.2 |
| | | | $Ca(OH)_2$ | — | — | — | — | — |
| | Titanium oxide | | | 4 | 4 | 4 | 4 | 4 |
| | Properties | Melt flow rate (g/10 min) | | 45 | 30 | NG | 13 | 15 |
| | | Slab hardness (Shore D) | | 59 | 58 | | 62 | 66 |
| | | Bending stiffness (MPa) | | 180 | 190 | | 230 | 215 |
| | | Repulsion resilience (%) | | 48 | 49 | | 54 | 55 |
| Golf ball Properties | Cover thickness (mm) | | | 1.0 | 1.0 | | 1.0 | 1.0 |
| | Cover hardness (Shore D) | | | 60 | 60 | | 64 | 67 |
| | Compression deformation amount (mm) | | | 3.00 | 3.00 | | 2.97 | 2.98 |
| | Paint adhesion | | | G | P | | P | P |

Formulation: parts by mass, NG: Impossible to mold.

TABLE 5

| | | | Golf ball No. | 16 | 17 |
|---|---|---|---|---|---|
| Cover composition | Core No. | | | A | A |
| | Resin component | (A) Component (a-1) | Himilan 1555(Na) | — | — |
| | | | Surlyn 8150(Na) | — | — |
| | | | Himilan AM7329(Zn) | — | — |
| | | | Surlyn 9150(Zn) | — | — |
| | | | Surlyn 6320(Mg) | 70 | — |
| | | | Himilan 1702(Zn) | — | — |
| | | (A) Component (a-2) | Nucrel 2050H | — | — |
| | | | Nucrel AN4318 | — | 80 |
| | | (B) component | Aclyn201(Ca) | — | — |
| | | | Aclyn295(Zn) | — | — |
| | | (D) component | Rabalon T3221C | — | — |
| | | | AC 540 | — | — |
| | | Fatty acid | Behenic acid | 30 | 20 |
| | | | Stearic acid | — | — |
| | | (C) component | $Mg(OH)_2$ | 0.7 | — |
| | | | $Ca(OH)_2$ | — | 4.8 |
| | Titanium oxide | | | 4 | 4 |
| | Properties | Melt flow rate (g/10 min) | | 11 | 1 |
| | | Slab hardness (Shore D) | | 43 | 52 |
| | | Bending stiffness (MPa) | | 34 | 107 |
| | | Repulsion resilience (%) | | 63 | 62 |
| Golf ball Properties | Cover thickness (mm) | | | 1.0 | 1.0 |
| | Cover hardness (Shore D) | | | 45 | 54 |
| | Compression deformation mount (mm) | | | 3.10 | 3.04 |
| | Paint adhesion | | | P | P |

Formulation: parts by mass

Notes on tables 2 to 5

Formulation: parts by mass

Himilan 1555: Sodium ion neutralized ethylene-methacrylic acid copolymer ionomer resin (Melt viscosity (190° C.) measured by a flow tester: 540 Pa · s, melt flow rate(190° C.*2.16 kg): 10 g/10 min) available from Du Pont-Mitsui Polychemicals Co., Ltd Surlyn 8150: Sodium ion neutralized ethylene-methacrylic acid copolymer ionomer resin (Melt viscosity (190° C.) measured by a flow tester: 1,200 Pa · s, melt flow rate(190° C.*2.16 kg): 4.5 g/10 min)available from E.I. du Pont de Nemours and Company Himilan AM7329: Zinc ion neutralized ethylene-methacrylic acid copolymer ionomer resin (Melt viscosity (190° C.) measured by a flow tester: 1,100 Pa · s, melt flow rate(190° C.*2.16 kg): 5 g/10 min) available from Du Pont-Mitsui Polychemicals Co., Ltd Surlyn 9150: Zinc ion neutralized ethylene-methacrylic acid copolymer ionomer resin (Melt viscosity (190° C.) measured by a flow tester: 1,200 Pa · s, melt flow rate(190° C.*2.16 kg): 4.5 g/10 min)available from E.I. du Pont de Nemours and Company Surlyn 6320: Magnesium ion neutralized ethylene-methacrylic acid copolymer ionomer resin (Melt viscosity (190° C.) measured by a flow tester: 4,700 Pa · s, melt flow rate(190° C.*2.16 kg): 1.1 g/10 min)available from E.I. du Pont de Nemours and Company Himilan 1702: Zinc ion neutralized ethylene-methacrylic acid copolymer ionomer resin (Melt viscosity (190° C.) measured by a flow tester: 540 Pa · s, melt flow rate (190° C.*2.16 kg): 10 g/10 min) available from Du Pont-Mitsui Polychemicals Co., Ltd Nucrel 2050H: ethylene-methacrylic acid copolymer (melt viscosity (190° C.) measured by a flow tester: 8 Pa · s, melt flow rate (190° C.*2.16 kg): 500 g/10 min) available from Du Pont-Mitsui Polychemicals Co., Ltd.

Nucrel AN4318: ethylene-methacrylic acid copolymer (melt viscosity (190° C.) measured by a flow tester: 160 Pa · s, melt flow rate (190° C.*2.16 kg): 30 g/10 min) available from Du Pont-Mitsui Polychemicals Co., Ltd.

Aclyn201: Calcium neutralized binary copolymer composed of ethylene and α,β-unsaturated carboxylic acid having 3 to 8 carbon atoms (Brookfield melt viscosity (190° C.): 5.5 Pa · s, melt flow rate (190° C.*2.16 kg): 185 g/10 min) available from Honeywell Aclyn295: Zinc neutralized binary copolymer composed of ethylene and α,β-unsaturated carboxylic acid having 3 to 8 carbon atoms (Brookfield melt viscosity (190° C.): 4.5 Pa · s, melt flow rate (190° C.*2.16 kg): 1,200 g/10 min) available from Honeywell Rabalon T3221C: Polystyrene elastomer available from Mitsubishi Chemical Corporation.

AC540: Binary copolymer composed of ethylene and α,β-unsaturated carboxylic acid having 3 to 8 carbon atoms (Brookfield melt viscosity (190° C.): 0.6 Pa · s) available from Honeywell Behenic acid: "NAA-222S powder" available from NOF Corporation Stearic acid: "Powder Stearic acid TUBAKI" available from NOF Corporation Magnesium hydroxide: Yoneyama Yakuhin Kogyo CO., LTD Calcium oxide: Yoneyama Yakuhin Kogyo Co., LTD As apparent from tables 2 to 5, the golf ball forming resin compositions used for golf balls No. 1 to No. 10 showed a high melt flow rate and an excellent fluidity, in spite of showing the high repulsion. Further, during molding, bleed out of the low molecular weight material like the fatty acid was not observed and thus the obtained golf ball showed a good paint adhesion.

Golf ball No. 11 is the cases that (C) the metal ion source was not contained. The repulsion of the golf ball forming resin composition was low. Golf balls No. 12, 14 to 17 are the cases that (B) the low melt viscosity ionomer resin was not contained and the low molecular weight material like a fatty acid was used. Bleed out occurred on the surface of the golf ball body and the adhesion of the paint film was not good. Golf ball No. 13 is the case that (B) the low melt viscosity ionomer resin was not contained. Due to the insufficient fluidity of the golf ball forming resin composition, it was impossible to mold the cover.

The present invention provides a golf ball excellent in the fluidity, the adhesion of the paint film, and the repulsion.

[Production of Golf Balls No. 18 to No. 35]

(1) Production of Center

The center rubber compositions having the formulations shown in Table 6 were kneaded and heat-pressed in upper and lower molds, each having a hemispherical cavity, at 170° C. for 15 minutes to prepare spherical cores. The amount of barium sulfate was adjusted appropriately to make a golf ball have a weight of 45.4 g.

TABLE 6

| | Core No. | A1 | A2 | A3 | A4 |
|---|---|---|---|---|---|
| Formu-lation | Polybutadiene | 100 | 100 | 100 | 100 |
| | Zinc acrylate | 25 | 25 | 25 | 25 |
| | Zinc oxide | 5 | 5 | 5 | 5 |
| | Diphenyl disulfide | 0.5 | 0.5 | 0.5 | 0.5 |
| | Dicumyl peroxide | 0.9 | 0.9 | 0.9 | 0.9 |
| | Barium sulfate | Appropriate Amount*) | Appropriate Amount*) | Appropriate Amount*) | Appropriate Amount*) |
| Prop-erties | Diameter (mm) | 38.8 | 39.2 | 37.6 | 36.6 |
| | Surface hardness (Shore D) | 49 | 49 | 49 | 49 |
| | Compression deformation amount (mm) | 4.0 | 4.0 | 4.0 | 4.0 |

Formulation: parts by mass
*)Depending on the cover composition, adjustment was made such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Diphenyl disulfide: manufactured by Sumitomo Seika Chemicals Co., Ltd.
Dicumyl peroxide: "Percumyl (registered trademark) D" manufactured by NOF Corporation.

(2) Preparation of Intermediate Layer Composition and Cover Composition

Blending materials shown in Tables 7 to 11 were mixed with a twin-screw kneading extruder to prepare intermediate layer compositions and cover compositions in the pellet form. The extruding conditions were a screw diameter of 45 mm, a screw rotational speed of 200 rpm, and screw L/D=35, and the mixtures were heated to 160 to 230° C. at the die position of the extruder.

TABLE 7

| Cover composition No | B | C |
|---|---|---|
| Formulation | Himilan 1555 | 33 | 48 |
| | Himilan AM7329 | 33 | 47 |
| | Rabalon T3221C | 34 | 5 |
| | Titanium oxide | 4 | 4 |
| Melt flow rate (g/10 min) | | 6 | 8 |
| Slab hardness (Shore D) | | 45 | 59 |
| Bending stiffness (MPa) | | 83 | 224 |
| Repulsion resilience (%) | | 55 | 53 |

Formulation: parts by mass
Note on table 7:
Himilan 1555: Sodium ion neutralized ethylene-methacrylic acid copolymer ionomer resin available from Du Pont-Mitsui Polychemicals Co., Ltd
Himilan AM7329: Zinc ion neutralized ethylene-methacrylic acid copolymer ionomer resin available from Du Pont-Mitsui Polychemicals Co., Ltd
Rabalon T3221C: Polystyrene elastomer available from Mitsubishi Chemical Corporation.

(3) Production of Golf Ball Body

The intermediate layer compositions obtained above were injection-molded onto the spherical centers to form the intermediate layers covering the centers and prepare spherical cores. Subsequently, golf balls were produced by injection-molding the cover composition onto the spherical cores to produce golf balls. Upper and lower molds for the intermediate layer and the cover have a spherical cavity with pimples, a part of which serves as a hold pin which is extendable and retractable.

When molding the intermediate layer, the hold pins were protruded to hold the center after the center was put in, the intermediate layer composition heated to 260° C. was charged into the mold under a pressure of 80 tons within 0.3 seconds, and cooled for 30 seconds. Then, the mold was opened, and the cores were taken out from the mold.

When molding the cover, the hold pins were protruded to hold the core after the core was put in, the cover composition heated to 210° C. was charged into the mold under a pressure of 80 tons within 0.3 seconds, and cooled for 30 seconds. Then, the mold was opened, and the golf ball bodies were taken out from the mold. The surface of the obtained golf ball bodies were treated with sandblast, marked, and painted with a clear paint. The paint was dried in an oven at 40° C. to form a paint film, and golf balls having a diameter of 42.8 mm and a mass of 45.4 g were obtained. The results of evaluations of the golf balls were also shown in tables 8 to 11.

TABLE 8

| Golf ball No. | | | | 18 | 19 | 20 | 21 | 22 |
|---|---|---|---|---|---|---|---|---|
| Intermediate layer composition | Center No. | | | A1 | A1 | A1 | A1 | A1 |
| | Resin component | (A)Component (a-1) | Himilan 1555(Na) | 30 | 35 | — | — | — |
| | | | Surlyn 8150(Na) | — | — | 35 | — | — |
| | | | Himilan AM7329(Zn) | 30 | 35 | — | — | 65 |
| | | | Surlyn 9150(Zn) | — | — | 35 | — | — |
| | | | Surlyn 6320(Mg) | — | — | — | 70 | — |

TABLE 8-continued

| | | | 18 | 19 | 20 | 21 | 22 |
|---|---|---|---|---|---|---|---|
| | (A)Component (a-2) | Nucrel 2050H | — | — | — | — | 25 |
| | | Nucrel AN4318 | — | — | — | — | — |
| | (B)component | Aclyn201(Ca) | — | — | — | 30 | — |
| | | Aclyn295(Zn) | 40 | 30 | 30 | — | 10 |
| | (D)component | Rabalon T3221C | — | — | — | — | — |
| | | AC 540 | — | — | — | — | — |
| | Fatty acid | Behenic acid | — | — | — | — | — |
| | | Stearic acid | — | — | — | — | — |
| | (C) component | Mg(OH)$_2$ | 1.7 | 2.0 | 2.2 | 0.7 | 1.8 |
| | | Ca(OH)$_2$ | — | — | — | — | — |
| Titanium oxide | | | 4 | 4 | 4 | 4 | 4 |
| Properties | Melt flow rate (g/10 min) | | 25 | 17 | 13 | 11 | 16 |
| | Slab hardness (Shore D) | | 60 | 60 | 67 | 45 | 60 |
| | Bending stiffness (MPa) | | 200 | 210 | 220 | 35 | 205 |
| | Repulsion resilience (%) | | 50 | 52 | 54 | 62 | 57 |
| Core Properties | Intermediate layer thickness (mm) | | 1.0 | 1.0 | 1.0 | 1.0 | 1.0 |
| | Core center hardness (Shore D) | | 40 | 40 | 40 | 40 | 40 |
| | Core surface hardness (Shore D) | | 62 | 62 | 68 | 47 | 62 |
| | Compression deformation amount (mm) | | 3.19 | 3.18 | 3.18 | 3.30 | 3.18 |
| Golf ball Properties | Cover composition No. | | C | C | C | B | C |
| | Cover thickness (mm) | | 1.0 | 1.0 | 1.0 | 1.0 | 1.0 |
| | Compression deformation amount (mm) | | 2.94 | 2.93 | 2.93 | 3.00 | 2.93 |
| | Adhesion | Durability | 110 | 114 | 115 | 119 | 122 |
| | between Layers | Delaminating ratio (%) | 8 | 0 | 0 | 8 | 0 |
| | Repulsion Coefficient (Index) | | 100.2 | 100.2 | 100.2 | 100.0 | 100.2 |

Formulation: parts by mass

TABLE 9

| | | | | Golf ball No. | 23 | 24 | 25 | 26 | 27 |
|---|---|---|---|---|---|---|---|---|---|
| Intermediate layer composition | Center No. | | | | A1 | A1 | A1 | A2 | A3 |
| | Resin component | (A)Component (a-1) | Himilan 1555(Na) | | — | — | 24 | 30 | 30 |
| | | | Surlyn 8150(Na) | | — | — | — | — | — |
| | | | Himilan AM7329(Zn) | | — | — | 24 | 30 | 30 |
| | | | Surlyn 9150(Zn) | | — | — | — | — | — |
| | | | Surlyn 6320(Mg) | | 60 | — | — | — | — |
| | | (A)Component (a-2) | Nucrel 2050H | | — | — | — | — | — |
| | | | Nucrel AN4318 | | 10 | 60 | — | — | — |
| | | (B)component | Aclyn201(Ca) | | 30 | 40 | — | — | — |
| | | | Aclyn295(Zn) | | — | — | 32 | 40 | 40 |
| | | (D)component | Rabalon T3221C | | — | — | 20 | — | — |
| | | | AC 540 | | — | — | — | — | — |
| | | Fatty acid | Behenic acid | | — | — | — | — | — |
| | | | Stearic acid | | — | — | — | — | — |
| | | (C) component | Mg(OH)$_2$ | | 0.6 | — | 1.4 | 1.7 | 1.7 |
| | | | Ca(OH)$_2$ | | — | 3.9 | — | — | — |
| | Titanium oxide | | | | 4 | 4 | 4 | 4 | 4 |
| | Properties | Melt flow rate (g/10 min) | | | 12 | 10 | 22 | 25 | 25 |
| | | Slab hardness (Shore D) | | | 46 | 50 | 48 | 60 | 60 |
| | | Bending stiffness (MPa) | | | 38 | 110 | 90 | 200 | 200 |
| | | Repulsion resilience (%) | | | 60 | 61 | 50 | 50 | 50 |
| Core Properties | Intermediate layer thickness (mm) | | | | 1.0 | 1.0 | 1.0 | 0.8 | 1.6 |
| | Core center hardness (Shore D) | | | | 40 | 40 | 40 | 40 | 40 |
| | Core surface hardness (Shore D) | | | | 48 | 52 | 50 | 62 | 62 |
| | Compression deformation amount (mm) | | | | 3.30 | 3.24 | 3.35 | 3.18 | 2.99 |
| Golf ball Properties | Cover composition No. | | | | B | B | B | C | C |
| | Cover thickness (mm) | | | | 1.0 | 1.0 | 1.0 | 1.0 | 1.0 |
| | Compression deformation amount (mm) | | | | 3.00 | 2.94 | 3.05 | 2.98 | 2.79 |
| | Adhesion | Durability | | | 117 | 112 | 109 | 106 | 117 |
| | between Layers | Delaminating ratio (%) | | | 0 | 8 | 0 | 16 | 0 |
| | Repulsion Coefficient (Index) | | | | 100.0 | 100.1 | 99.9 | 100.3 | 100.0 |

Formulation: parts by mass

TABLE 10

| | | | | Golf ball No. | 28 | 29 | 30 | 31 | 32 |
|---|---|---|---|---|---|---|---|---|---|
| Intermediate layer composition | Center No. | | | | A4 | A1 | A1 | A1 | A1 |
| | Resin component | (A)Component (a-1) | Himilan 1555(Na) | | 30 | 30 | 30 | 50 | 45 |
| | | | Surlyn 8150(Na) | | — | — | — | — | — |
| | | | Himilan AM7329(Zn) | | 30 | 30 | 30 | 50 | 45 |
| | | | Surlyn 9150(Zn) | | — | — | — | — | — |
| | | | Surlyn 6320(Mg) | | — | — | — | — | — |
| | | (A)Component (a-2) | Nucrel 2050H | | — | — | — | — | — |
| | | | Nucrel AN4318 | | — | — | — | — | — |
| | | (B)component | Aclyn201(Ca) | | — | — | — | — | — |
| | | | Aclyn295(Zn) | | 40 | 40 | — | — | — |
| | | (D)component | Rabalon T3221C | | — | — | — | — | — |
| | | | AC 540 | | — | — | — | — | 10 |
| | | Fatty acid | Behenic acid | | — | — | 40 | — | — |
| | | | Stearic acid | | — | — | — | — | — |
| | | (C) component | $Mg(OH)_2$ | | 1.7 | — | 1.7 | 2.8 | 2.5 |
| | | | $Ca(OH)_2$ | | — | — | — | — | — |
| | Titanium oxide | | | | 4 | 4 | 4 | 4 | 4 |
| | Properties | Melt flow rate (g/10 min) | | | 25 | 45 | 30 | NG | 13 |
| | | Slab hardness (Shore D) | | | 60 | 59 | 58 | | 62 |
| | | Bending stiffness (MPa) | | | 200 | 180 | 190 | | 230 |
| | | Repulsion resilience (%) | | | 50 | 48 | 49 | | 54 |
| Core Properties | Intermediate layer thickness (mm) | | | | 2.1 | 1.0 | 1.0 | | 1.0 |
| | Core center hardness (Shore D) | | | | 40 | 40 | 40 | | 40 |
| | Core surface hardness (Shore D) | | | | 62 | 60 | 60 | | 64 |
| | Compression deformation amount (mm) | | | | 2.84 | 3.20 | 3.20 | | 3.17 |
| Golf ball Properties | Cover composition No. | | | | C | B | B | | C |
| | Cover thickness (mm) | | | | 1.0 | 1.0 | 1.0 | | 1.0 |
| | Compression deformation amount (mm) | | | | 2.67 | 2.90 | 2.90 | | 2.92 |
| | Adhesion between Layers | Durability | | | 126 | 100 | 80 | | 90 |
| | | Delaminating ratio (%) | | | 0 | 25 | 92 | | 75 |
| | Repulsion Coefficient (Index) | | | | 99.5 | 100.0 | 100.0 | | 100.2 |

Formulation: parts by mass,
NG: Impossible to mold

TABLE 11

| | | | | Golf ball No. | 33 | 34 | 35 |
|---|---|---|---|---|---|---|---|
| Intermediate layer composition | Center No. | | | | A1 | A1 | A1 |
| | Resin component | (A)Component (a-1) | Himilan 1555(Na) | | — | — | — |
| | | | Surlyn 8150(Na) | | 35 | — | — |
| | | | Himilan AM7329(Zn) | | — | — | — |
| | | | Surlyn 9150(Zn) | | 35 | — | — |
| | | | Surlyn 6320(Mg) | | — | 70 | — |
| | | (A)Component (a-2) | Nucrel 2050H | | — | — | — |
| | | | Nucrel AN4318 | | — | — | 80 |
| | | (B)component | Aclyn201(Ca) | | — | — | — |
| | | | Aclyn295(Zn) | | — | — | — |
| | | (D)component | Rabalon T3221C | | — | — | — |
| | | | AC 540 | | — | — | — |
| | | Fatty acid | Behenic acid | | — | 30 | 20 |
| | | | Stearic acid | | 30 | — | — |
| | | (C) component | $Mg(OH)_2$ | | 2.2 | 0.7 | — |
| | | | $Ca(OH)_2$ | | — | — | 4.8 |
| | Titanium oxide | | | | 4 | 4 | 4 |
| | Properties | Melt flow rate (g/10 min) | | | 15 | 11 | 1 |
| | | Slab hardness (Shore D) | | | 66 | 43 | 52 |
| | | Bending stiffness (MPa) | | | 215 | 34 | 107 |
| | | Repulsion resilience (%) | | | 55 | 63 | 62 |
| Core Properties | Intermediate layer thickness (mm) | | | | 1.0 | 1.0 | 1.0 |
| | Core center hardness (Shore D) | | | | 40 | 40 | 40 |
| | Core surface hardness (Shore D) | | | | 67 | 45 | 54 |
| | Compression deformation amount (mm) | | | | 3.18 | 3.30 | 3.24 |

TABLE 11-continued

| Golf ball No. | | 33 | 34 | 35 |
|---|---|---|---|---|
| Golf ball Properties | Cover composition No. | C | B | B |
| | Cover thickness (mm) | 1.0 | 1.0 | 1.0 |
| | Compression deformation amount (mm) | 2.93 | 3.00 | 2.94 |
| | Adhesion between Layers — Durability | 81 | 86 | 89 |
| | Adhesion between Layers — Delaminating ratio (%) | 100 | 83 | 75 |
| | Repulsion Coefficient (Index) | 100.1 | 99.8 | 99.9 |

Formulation: parts by mass

Note on tables 8 to 11
Details of the materials are described in Notes on tables 2 to 5.

The golf ball forming resin compositions used for golf balls No. 18 to No. 28 showed a high melt flow rate and an excellent fluidity, in spite of showing the high repulsion. Further, during molding of the intermediate layer, bleed out of the low molecular weight material like the fatty acid was not observed and thus the obtained golf balls No. 18 to No. 28 using the golf ball forming resin composition of the present invention showed a good adhesion between the layers. Among them, since the golf ball No. 28 has a relatively thick intermediate layer, the repulsion coefficient of the resultant golf ball was slightly lowered, in spite of good durability.

Golf ball No. 29 is the cases that (C) the metal ion source was not contained. The repulsion of the golf ball forming resin composition was low, although the golf ball forming resin composition showed the high melt flow rate and high fluidity. Golf balls No. 30, 32 to 35 are the cases that the (B) the low melt viscosity ionomer resin was not contained and the low molecular weight material like a fatty acid was used. The adhesion between the layers were lowered for these golf balls. Golf ball No. 31 is the case that (B) the low melt viscosity ionomer resin and the low molecular weight material like a fatty acid were not contained. Due to the insufficient fluidity of the golf ball forming resin composition, it was impossible to mold the cover.

The present invention relates to the golf ball, especially, to the improved technology of the intermediate layer properties and molding of the intermediate layer.

This application is based on Japanese Patent applications No. 2008-243171 filed on Sep. 22, 2008, and No. 2008-322951 filed on Dec. 18, 2008, the contents of which are hereby incorporated by reference.

The invention claimed is:

1. A golf ball comprising:
a core consisting of a center and at least one intermediate layer covering the center,
a cover covering the core, wherein at least one piece or one layer of the intermediate layer is formed from a golf ball forming resin composition comprising as a resin component,
(A) a high melt viscosity resin containing:
(a-1) a high melt viscosity ionomer resin having a melt viscosity (190° C.) ranging from 500 Pa·s to 100,000 Pa·s measured by a flow tester and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, and/or
(a-2) a high melt viscosity nonionic resin having a melt viscosity (190° C.) ranging from 5 Pa·s to 3,000 Pa·s measured by a flow tester and consisting of a binary copolymer composed of ethylene and α,β-unsaturated carboxylic acid having 3 to 8 carbon atoms, a ternary copolymer composed of ethylene, α,β-unsaturated carboxylic acid having 3 to 8 carbon atoms and α,β-unsaturated carboxylic acid ester, or a mixture thereof;
(B) a low melt viscosity ionomer resin having a melt viscosity (190° C.) ranging from 1 Pa·s to 10 Pa·s measured by a brookfield viscometer, and consisting of a metal ion-neutralized product of a binary copolymer composed of ethylene and α,β-unsaturated carboxylic acid having 3 to 8 carbon atoms, a metal ion-neutralized product of a ternary copolymer composed of ethylene, α,β-unsaturated carboxylic acid having 3 to 8 carbon atoms and α,β-unsaturated carboxylic acid ester, or a mixture thereof, in a ratio of (A) the high melt viscosity resin/(B) the low melt viscosity ionomer resin being 55 mass % to 99 mass %/45 mass % to 1 mass %; and
(C) a metal ion source capable of neutralizing carboxyl groups of (A) the high melt viscosity resin and (B) the low melt viscosity ionomer resin, in an amount of from 0.1 part to 10 parts with respect to 100 parts by mass of a sum of (A) the high melt viscosity resin and (B) the low melt viscosity ionomer resin;
wherein the golf ball forming resin composition has a melt flow rate (190° C., 2.16 kg) ranging from 10 g/10 min to 100 g/10 min.

2. The golf ball according to claim 1, wherein (A) the high melt viscosity resin consists of (a-1) the high melt viscosity ionomer resin as a resin component.

3. The golf ball according to claim 1, wherein (A) the high melt viscosity resin consists of (a-2) the high melt viscosity nonionic resin as a resin component.

4. The golf ball according to claim 1, wherein (A) the high melt viscosity resin contains (a-1) the high melt viscosity ionomer resin and (a-2) the high melt viscosity nonionic resin in a ratio of (a-1) the high melt viscosity ionomer resin to (a-2) the high melt viscosity nonionic resin being 1 mass % to 90 mass % to 99 mass % to 10 mass %.

5. The golf ball according to claim 1, wherein the golf ball forming resin composition further comprises (D) a thermoplastic resin and/or thermosetting resin in an amount from 0 part (exclusive) to 100 parts with respect to 100 parts by mass of a sum of (A) the high melt viscosity resin and (B) the low melt viscosity ionomer resin.

6. The golf ball according to claim 1, wherein the golf ball forming resin composition has a slab hardness ranging from 20 to 70 in Shore D hardness.

7. The golf ball according to claim 1, wherein the intermediate layer has a thickness ranging from 0.1 mm to 2.0 mm.

8. A method for producing a golf ball having a core consisting of a center and at least one intermediate layer covering the center and a cover covering the core, comprising:
mixing (A) a high melt viscosity resin containing (a-1) a high melt viscosity ionomer resin having a melt viscosity (190° C.) ranging from 500 Pa·s to 100,000 Pa·s measured by a flow tester and consisting of a metal-ion neutralized product of a binary copolymer composed of ethylene and α,β-unsaturated carboxylic acid having 3 to 8 carbon atoms, a metal ion neutralized product of a ternary copolymer composed of ethylene, α,β-unsaturated carboxylic acid having 3 to 8 carbon atoms and α,β-unsaturated carboxylic acid ester, or a mixture thereof, and/or (a-2) a high melt viscosity nonionic resin having a melt viscosity (190° C.) ranging from 5 Pa·s to 3,000 Pa·s measured by a flow tester and consisting of a binary copolymer composed of ethylene and α,β-unsaturated carboxylic acid having 3 to 8 carbon atoms, a ternary copolymer composed of ethylene, α,β-unsaturated carboxylic acid having 3 to 8 carbon atoms and α,β-unsaturated carboxylic acid ester, or a mixture thereof;

(B) a low melt viscosity ionomer resin having a melt viscosity (190° C.) ranging from 1 Pa·s to 10 Pa·s measured by a brookfield viscometer, and consisting of a metal ion-neutralized product of a binary copolymer composed of ethylene and α,β-unsaturated carboxylic acid having 3 to 8 carbon atoms, a metal-ion-neutralized product of a ternary copolymer composed of ethylene, α,β-unsaturated carboxylic acid having 3 to 8 carbon atoms and α,β-unsaturated carboxylic acid ester, or a mixture thereof, and (C) a metal ion source capable of neutralizing carboxyl groups of (A) the high melt viscosity resin and (B) the low melt viscosity ionomer resin, in a ratio of (A) the high melt viscosity resin/(B) the low melt viscosity ionomer resin being 55 mass % to 99 mass %/45 mass % to 1 mass %; and in an amount of (C) the metal ion source being from 0.1 part to 10 parts with respect to 100 parts by mass of a sum of (A) the high melt viscosity resin and (B) the low melt viscosity ionomer resin, thereby neutralizing carboxyl groups of (A) the high melt viscosity resin and (B) the low melt viscosity ionomer resin and preparing a golf ball forming resin composition having a melt flow rate (190° C., 2.16 kg) ranging from 10 g/10 min to 100 g/10 min;

molding an intermediate layer from the golf ball forming resin composition; and forming a cover from a cover composition onto the intermediate layer.

* * * * *